United States Patent
Waltz et al.

(10) Patent No.: US 11,252,119 B2
(45) Date of Patent: Feb. 15, 2022

(54) MESSAGE LOGGING USING TWO-STAGE MESSAGE LOGGING MECHANISMS

(71) Applicant: salesforce.com, inc., San Francisco, CA (US)

(72) Inventors: D. Thomas Waltz, San Francisco, CA (US); Jonathan Bennett, San Francisco, CA (US); Paul Beck, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 15 days.

(21) Appl. No.: 15/997,215

(22) Filed: Jun. 4, 2018

(65) Prior Publication Data
US 2019/0372924 A1    Dec. 5, 2019

(51) Int. Cl.
*H04L 12/58*    (2006.01)
*H04L 51/18*    (2022.01)
*G06F 16/22*    (2019.01)

(52) U.S. Cl.
CPC .......... *H04L 51/18* (2013.01); *G06F 16/2282* (2019.01)

(58) Field of Classification Search
CPC ............................ H04L 51/18; G06F 16/2282
USPC ........................................................ 709/206
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

Salesforce, Soap API Developer Guide, Version 41.0, Winter 2018, Updated Oct. 5, 2017, pp. 2743-2751; entire document located: https://developer.salesforce.com/.

(Continued)

*Primary Examiner* — Schquita D Goodwin
(74) *Attorney, Agent, or Firm* — Schwabe Williamson & Wyatt

(57) ABSTRACT

Systems, methods, and computer-readable media are provided for logging message data with reduced the latency and decreased overhead in multi-tenant systems. A message server may implement a two-stage process for logging the message data. In the first stage, the message server may create job-specific and write-optimized staging tables for each message processing job, and may store the message data for each job in a corresponding staging table. This may be done as the message server is building and sending the messages for each job. Additionally, the message server may partition or shard the staging tables so that the write operations are spread to multiple storage disks to avoid creating a storage server hotspot or bottleneck. In the second stage, the message server may move the accumulated message data from the individual staging tables to a corresponding tenant space at regular intervals. Other embodiments may be described and/or claimed.

17 Claims, 7 Drawing Sheets

(56) References Cited

U.S. PATENT DOCUMENTS

| | | |
|---|---|---|
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 6,944,817 B1 | 9/2005 | Danneels |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,117,246 B2 | 10/2006 | Christenson |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B2 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,037,140 B2 | 10/2011 | DelGaudio |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,203,426 B1 | 6/2012 | Hirschfeld |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,280,913 B2 | 10/2012 | Bergin |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,949,351 B2 | 2/2015 | Ciancio-Bunch |
| 9,405,896 B2 * | 8/2016 | Simone .................... G06F 8/20 |
| 9,613,085 B2 | 4/2017 | Ciancio-Bunch |
| 9,813,260 B1 * | 11/2017 | Morgan ................ H04L 12/581 |
| 9,967,255 B2 | 5/2018 | Ciancio-Bunch |
| 10,445,520 B2 | 10/2019 | Ciancio-Bunch et al. |
| 10,515,326 B2 | 12/2019 | Waltz |
| 10,693,952 B2 | 6/2020 | Waltz et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2002/0198973 A1 | 12/2002 | Besaw |
| 2003/0004971 A1 | 1/2003 | Gong |
| 2003/0018705 A1 | 1/2003 | Chen et al. |
| 2003/0018830 A1 | 1/2003 | Chen et al. |
| 2003/0055757 A1 | 3/2003 | Pfiffner |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0115548 A1 | 6/2003 | Melgar |
| 2003/0117437 A1 | 6/2003 | Cook |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |

(56) References Cited

U.S. PATENT DOCUMENTS

| | | |
|---|---|---|
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0010470 A1 | 1/2005 | Marino |
| 2005/0050555 A1 | 3/2005 | Exley et al. |
| 2005/0091098 A1 | 4/2005 | Brodersen et al. |
| 2005/0198121 A1 | 9/2005 | Daniels |
| 2005/0228824 A1 | 10/2005 | Gattuso |
| 2005/0283461 A1 | 12/2005 | Sell |
| 2006/0075228 A1 | 4/2006 | Black |
| 2006/0123089 A1* | 6/2006 | Cahn ............... H04W 4/12 709/206 |
| 2006/0174033 A1 | 8/2006 | Gillum |
| 2007/0073814 A1 | 3/2007 | Kamat |
| 2007/0192121 A1 | 8/2007 | Routson |
| 2007/0277099 A1 | 11/2007 | Nakayama |
| 2008/0249972 A1 | 10/2008 | Dillon |
| 2009/0006467 A1 | 1/2009 | Visscher |
| 2009/0013375 A1 | 1/2009 | MacIntosh |
| 2009/0063415 A1 | 3/2009 | Chatfield et al. |
| 2009/0082051 A1 | 3/2009 | Ruotsi |
| 2009/0100342 A1 | 4/2009 | Jakobson |
| 2009/0132868 A1* | 5/2009 | Chkodrov ............... H04L 51/00 714/54 |
| 2009/0144201 A1 | 6/2009 | Gierkink |
| 2009/0177744 A1 | 7/2009 | Marlow et al. |
| 2009/0319781 A1 | 12/2009 | Byrum |
| 2010/0299664 A1 | 11/2010 | Taylor |
| 2010/0305988 A1 | 12/2010 | Agarwal |
| 2011/0010548 A1 | 1/2011 | Stewart |
| 2011/0218958 A1 | 9/2011 | Warshavsky |
| 2011/0247051 A1 | 10/2011 | Bulumulla |
| 2011/0258178 A1 | 10/2011 | Eidson |
| 2011/0258179 A1 | 10/2011 | Weissman |
| 2011/0258628 A1 | 10/2011 | Devadhar |
| 2011/0258630 A1 | 10/2011 | Fee |
| 2012/0042218 A1 | 2/2012 | Cinarkaya |
| 2012/0059906 A1 | 3/2012 | Ciancio-Bunch |
| 2012/0110002 A1 | 5/2012 | Giambalvo |
| 2012/0173631 A1* | 7/2012 | Yoakum ............... H04L 51/26 709/206 |
| 2012/0233137 A1 | 9/2012 | Jakobson et al. |
| 2012/0290407 A1 | 11/2012 | Hubbard et al. |
| 2013/0151943 A1 | 6/2013 | Zhu |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0238718 A1 | 9/2013 | Santos |
| 2013/0247216 A1 | 9/2013 | Cinarkaya |
| 2014/0032484 A1 | 1/2014 | Cameron |
| 2014/0032683 A1* | 1/2014 | Maheshwari ......... H04L 51/063 709/206 |
| 2014/0074558 A1 | 3/2014 | Jain |
| 2014/0108443 A1 | 4/2014 | Ciancio-Bunch |
| 2014/0173012 A1 | 6/2014 | Ciancio-Bunch |
| 2014/0359537 A1 | 12/2014 | Jackobson et al. |
| 2015/0074783 A1* | 3/2015 | Clothier ............. H04L 63/0815 726/8 |
| 2015/0082387 A1 | 3/2015 | Ciancio-Bunch |
| 2015/0142844 A1* | 5/2015 | Bruce ................ G06F 16/20 707/760 |
| 2015/0207855 A1* | 7/2015 | Hanckel ............... H04L 41/06 709/201 |
| 2016/0119268 A1* | 4/2016 | Sharp ................ H04L 51/12 709/206 |
| 2016/0134573 A1* | 5/2016 | Gagliardi ............. H04L 51/26 709/204 |
| 2016/0224799 A1* | 8/2016 | Uzun ................ G06F 21/6227 |
| 2016/0285623 A1* | 9/2016 | Yoon ................ G06F 21/6227 |
| 2016/0294748 A1* | 10/2016 | Yang ................ G06Q 50/01 |
| 2016/0299779 A1 | 10/2016 | Kulkarni |
| 2016/0350303 A1* | 12/2016 | Fischer ............... G06F 16/258 |
| 2016/0350392 A1* | 12/2016 | Rice ................ G06F 16/27 |
| 2017/0005881 A1* | 1/2017 | Casalaina ............ H04L 51/36 |
| 2017/0006037 A1* | 1/2017 | Simone ............... G06F 21/41 |
| 2017/0286468 A1* | 10/2017 | Hoyle ................ G06F 16/2282 |
| 2018/0026877 A1* | 1/2018 | Mysyk ............... H04L 45/04 709/206 |
| 2018/0181900 A1* | 6/2018 | Huggins .......... G06Q 10/06395 |
| 2018/0329966 A1* | 11/2018 | Ranganathan .......... G06F 9/524 |
| 2019/0028555 A1* | 1/2019 | Du .................. H04L 67/1097 |
| 2019/0205437 A1* | 7/2019 | Larson ............... G06F 16/1805 |
| 2019/0372924 A1 | 12/2019 | Waltz et al. |
| 2019/0386945 A1* | 12/2019 | Wills .................. H04L 51/18 |

OTHER PUBLICATIONS

International Search Report dated Oct. 11, 2013, in corresponding International Application No. PCT/US2013/035763.

International Searching Authority, International Search Report for PCT/US2010/026552, dated Apr. 23, 2010.

International Searching Authority, Written Opinion of the ISA for PCT/US2010/0265 52, dated Apr. 23, 2010.

Supplementary European Search Report dated May 9, 2014 in corresponding European Application No. 10749445.2.

Fette, I., Melnikov, A., "The Websocket Protocol", Internet Engineering Task Force (IETF) Request for Comments 6455; ISSN: 2070-1721; Dec. 2011, pp. 1-71.

MSGP ACK Overview htms :// github .com/ms g2ack/ms g2ack/ blog/master/ s2ec .md#overview; Oct. 11, 2017, pp. 1-11.

SMPP Developers Forum, "Short Message Peer to Peer Protocol Specification v3.4", Issue 1.2, Oct. 12, 1999, pp. 1-169.

SMS Forum, "Short Message Peer to Peer Protocol Specification, Version 5.0," Feb. 19, 2003, pp. 1-166.

Yoshino, T., "Compression Extensions for WebSocket", Internet Engineering Task Force (IETF) Request for Comments 7692; ISSN: 2070-1721; Dec. 2015, pp. 1-28.

\* cited by examiner

FIGURE 4

MESSAGE LOGGING USING TWO-STAGE MESSAGE LOGGING MECHANISMS

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to database systems, and in particular to systems and methods for processing and logging messages to be sent to individual recipients.

BACKGROUND

In multi-tenant database systems, customer organizations (also referred to as "tenants") may share database resources in one logical database. The databases themselves are typically shared, and each tenant is typically associated with an organization identifier (org ID) column or field that may be used to identify rows or records belonging to each tenant. Each tenant may provide their own custom data, which may include defining custom objects and custom fields, as well as designating one or more custom fields to act as custom index fields. Users of a multi-tenant database system (e.g., a tenant/organization (org) or developers associated with the tenant) may develop applications or platforms that interact or integrate with the multi-tenant database system and utilize data from an associated tenant space. The applications/platforms may obtain data from the associated tenant space to render/display visual representations of relevant tenant data. In some cases, the applications/platforms may utilize tenant data for interacting with clients by, for example, sending messages to various clients/customers of the tenant via the multi-tenant database system. To do so, the applications/platforms may include program code or script(s) that call an application programming interface (API) or graphical user interface (GUI) to create and execute the sending of these messages based on various interactions with the tenant platform and/or various triggering events. Some multi-tenant systems may enable their tenants to define custom database object(s) that store (log) data of messages to be sent to individual recipients.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 4 shows an example graphical user interface for monitoring and managing send logging job functionality, according to various embodiments.

DETAILED DESCRIPTION

Figure 1A:
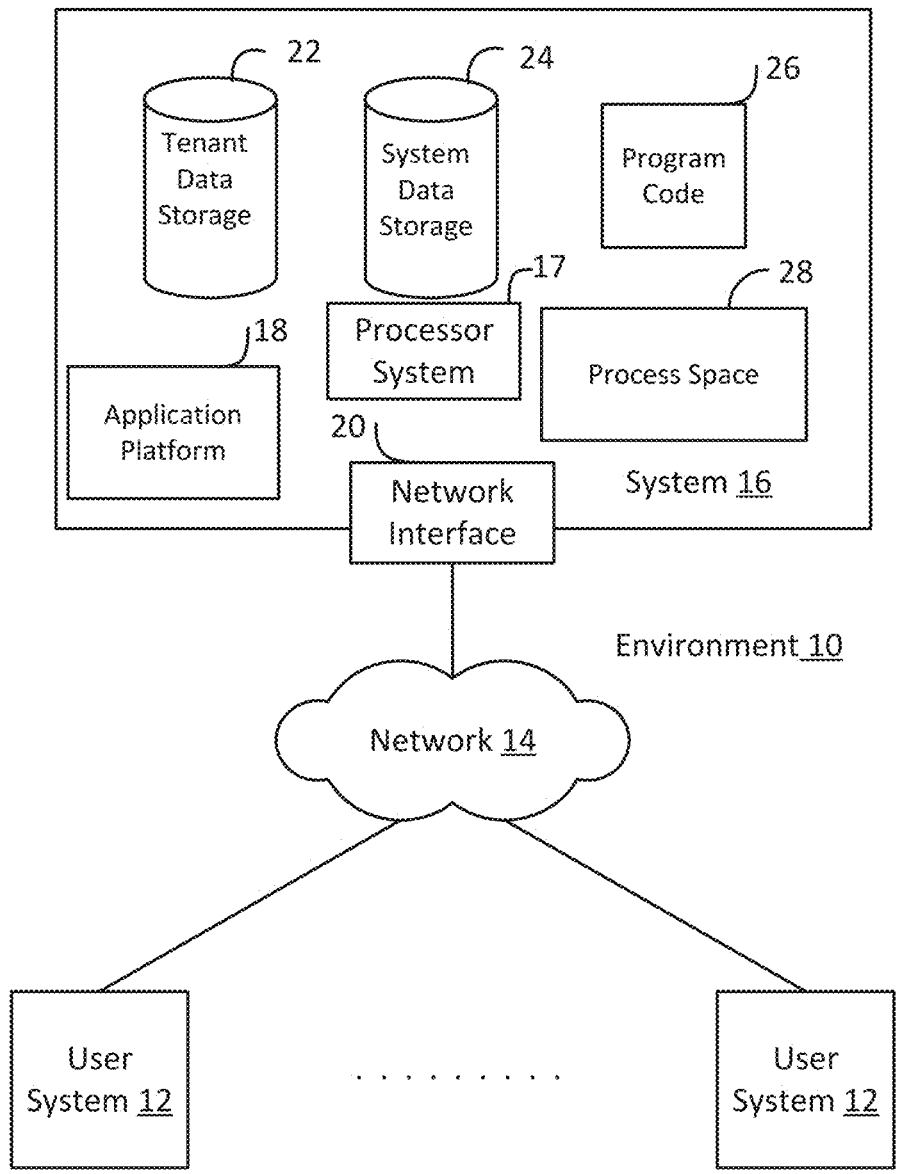
FIG. 1A shows a block diagram of an example environment in which an on-demand database service can be used according to some implementations.

Embodiments discussed herein provide mechanisms for logging message data with low latency and increased storage efficiency, which may be deployed in multi-tenant systems. Disclosed embodiments reduce the latency and increase the storage efficiency for message data logging using a two-stage process. In the first stage, a message server (or Outgoing Mail Manager (OMM)) may create job-specific and write-optimized staging tables for each message processing job, and may store the message data for each job in a corresponding staging table. This may be done as the OMM is building and sending the messages for each job through multiple job specific processes running in parallel over many servers. Additionally, the OMM may partition or shard the staging tables so that the write operations are spread to multiple storage disks to avoid creating a storage server hotspot or bottleneck. In the second stage, the OMM may move the accumulated message data from the individual staging tables to a corresponding tenant space at regular intervals. Other embodiments may be described and/or claimed Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

As used herein, the term "tenant" may include a group of users who share common access with specific privileges to a software instance. A multi-tenant architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants. As used herein, the term an "instance" may refer to a concrete occurrence of an object, which may occur, for example, during execution of program code, and the terms "instantiate", "instantiation", and the like may refer to the creation of an instance.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 114, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In embodiments, the tenant data storage 22, the system data storage 24, and/or some other data store (not shown) may include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16. The applications of the application platform 18 may be developed with server-side programming languages, such as PHP, Java and/or Java Server Pages (JSP), Node.js, ASP.NET, and/or any other like technology that renders HTML. The applications may be built using a platform-specific and/or proprietary development tool and/or programming languages, such as Salesforce® Apex and/or the like.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a local area network (LAN), wide area network (WAN), telephone network, wireless network, cellular network, point-to-point network, star network, token ring network, hub network, or other appropriate configuration. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol. The network 14 may comprise one or more network elements, each of which may include one or more processors, communications systems (e.g., including network interface controllers, one or more transmitters/receivers connected to one or more antennas, etc.), and computer readable media. Examples of such network elements may include wireless APs (WAPs), a home/business server (with or without radio frequency (RF) communications circuitry), routers, switches, hubs, radio beacons, (macro or small-cell) base stations, a backhaul or core network comprising one or more servers (e.g., standalone, rack-mounted, blade, etc.), and/or any other like devices/systems. Connection to the network 14 may be via a wired or a wireless connection using one or more of the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. Connection to the network 14 may require that the various devices and network elements execute software routines which enable, for example, the seven layers of the open systems interconnection (OSI) model of computer networking or equivalent in a wireless network.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), Session Initiation Protocol (SIP) with Real-Time Transport Protocol (RTP or Secure RTP (SRTP), WebSocket protocol, Java Message Service (JMS), Java Business Integration (JBI), etc. In an example where HTTP is used, each user system 12 can include an HTTP client commonly referred to as a "web browser" or simply a "browser" for sending and receiving HTTP signals to and from an HTTP server (also referred to as a "web server") of the system 16. In this example, each user system 12 may send and receive HTTP messages where a header of each message includes various operating parameters and the body of the such messages may include hypertext markup language (HTML), extensible markup language (XML), JavaScript Object Notation (JSON), etc. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, WAP-enabled device, or other computing device capable of interfacing directly or indirectly to the Internet or other network. The terms "user system" and "computing device" are used interchangeably herein with one another and with the term "computer."

As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, and/or the like, to execute and render web applications allowing a user (for example, a subscriber of on-demand services provided by the system 16) of the user system 12 to access, process and view information, pages, interfaces, and applications available to it from the system 16 over the network 14. In other implementations, each user system 12 may operate a user (or third party) application designed to interact with applications of the application platform 18 allowing a user (for example, a subscriber of on-demand services provided by the system 16) of the user system 12 to access, process and view information, pages and applications available to it from the system 16 over the network 14. The user application may be platform-specific, such as when the user system 12 is implemented in a mobile device, such as a smartphone, tablet computer, and the like. This application may be a native application (e.g., executed and rendered in an application container or skeleton) or a hybrid application (e.g., web applications being executed/rendered in an application container/skeleton).

The (web or third party) applications may be built using any suitable programming language and/or scripting language, such as HTML, Cascading Stylesheets (CSS), Java™ JavaScript and/or Server-Side JavaScript (SSJS), JQuery, PHP, Pearl, Python, Ruby on Rails, Accelerated Mobile Pages Script (AMPscript), JavaScript, Mustache Template Language, Handlebars Template Language, Guide Template Language (GTL), and the like. The applications may also be built using any suitable website development tools and/or a development environment (also referred to as a "dev-environment" or the like) such as a software development platform (SDP), integrated development environment (IDE), software development kit (SDK), software development environment (SDE), a schema builder, a modeling language application, a source code editor, build automation tools, debugger, compiler, interpreter, and/or some other like platform, framework, tools, etc., that may assist developers in building applications and/or configurations/definitions discussed herein. In some implementations, the dev-environment may be a standalone application, or may be a web-based or cloud-based environment (e.g., a native application, a web application, or a hybrid application including graphical user interfaces (GUIs) that render an SDE/IDE/SDK/SDP implemented by a backend service (e.g., database system 16, a cloud service provider, etc.) in a web browser or container). In some implementations, the dev-environment may be a platform-specific development environment and/or include platform-specific programming languages or development tools (e.g., Salesforce® Apex, Salesforce® Visualforce®, Salesforce® Lightning®, Salesforce® Wave™ Dashboard Designer, Salesforce® Force.com® IDE, Android® Studio™ IDE, Apple® iOS® SDK, etc.). The term "platform-specific" may refer to the platform implemented by the user system 12 and/or the platform implemented by the database system 16. Furthermore, such applications may utilize a suitable querying language to query and store information in an associated tenant space, such as Structure Query Language (SQL), object query language (OQL), Salesforce® OQL (SOQL), Salesforce® object search language (SOSL), Salesforce® analytics query language (SAQL), and/or other like query languages.

Regardless of whether this application is a native application, web application, or hybrid application, the user systems 12 may implement such applications to request and obtain data from database system 16, and render GUIs in an container or browser. In various embodiments, the GUIs may include a data analytics GUI, such as Salesforce® Wave™ dashboard, which may provide visual representations of data residing in an enterprise cloud or in an on-demand services environment (e.g., a tenant space within database system 16). In embodiments, the GUI may include one or more graphical control elements (GCEs) or widgets, which may enable a user of a user system 12 to select visualization parameters (also referred to as "lens parameters" or "filters") for displaying data from one or more datasets. A dataset may be a specific view or transformation of data from one or more data sources (e.g., a tenant space of database 22, etc.). The visualization parameters may include, for example, a selection of data or data type to display from one or more datasets; a particular graph, chart, or map in which to view the selected data; color schemes for the graphs/charts/maps; a position or orientation of the graphs/charts/maps within the GUI, etc. The graphs/charts/maps to be displayed may be referred to as a "lens" or a "dashboard". A lens may be a particular view of data from one or more datasets, and a dashboard may be a collection of lenses. In embodiments, the GUI may display lenses, dashboards, and/or control panels to alter or rearrange the lenses/dashboards.

Each user system 12 typically includes an operating system (OS) to manage computer hardware and software resources, and provide common services for various applications. The OS may include one or more drivers and/or APIs that provide an interface to hardware devices thereby enabling the OS and applications to access hardware functions. In some embodiments, the OS may include middleware that may connect two or more separate applications or connect applications with underlying hardware components beyond those available from OS and/or the drivers/APIs. The OS may be a general purpose operating system or an operating system specifically written for and tailored to the user system 12.

Each user system 12 also typically includes one or more user input devices, such as a keyboard, a mouse, a trackball, a touch pad, a touch screen, a pen or stylus or the like, for interacting with a GUI provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using one or more central processing units (CPUs) and/or other like computer processing devices, such as Intel Pentium® or Core® processor(s); Advanced Micro Devices (AMD) Ryzen® processor(s) or Accelerated Processing Units (APUs); or the like. Similarly, the system 16 (and additional instances of an MTS, where more than one is present) and all of its components can be operator-configurable using application(s) including computer code to run using the processor system 17, which may include one or more CPUs/processors, which may include one or multiple Intel Pentium® or Xeon® processors, one or more AMD Epyc® processors, or the like.

The system 16 includes tangible computer-readable media having non-transitory instructions stored thereon/in that are executable by or used to program a server (e.g., the app servers 100 and OMM entities 350/message servers discussed herein) or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
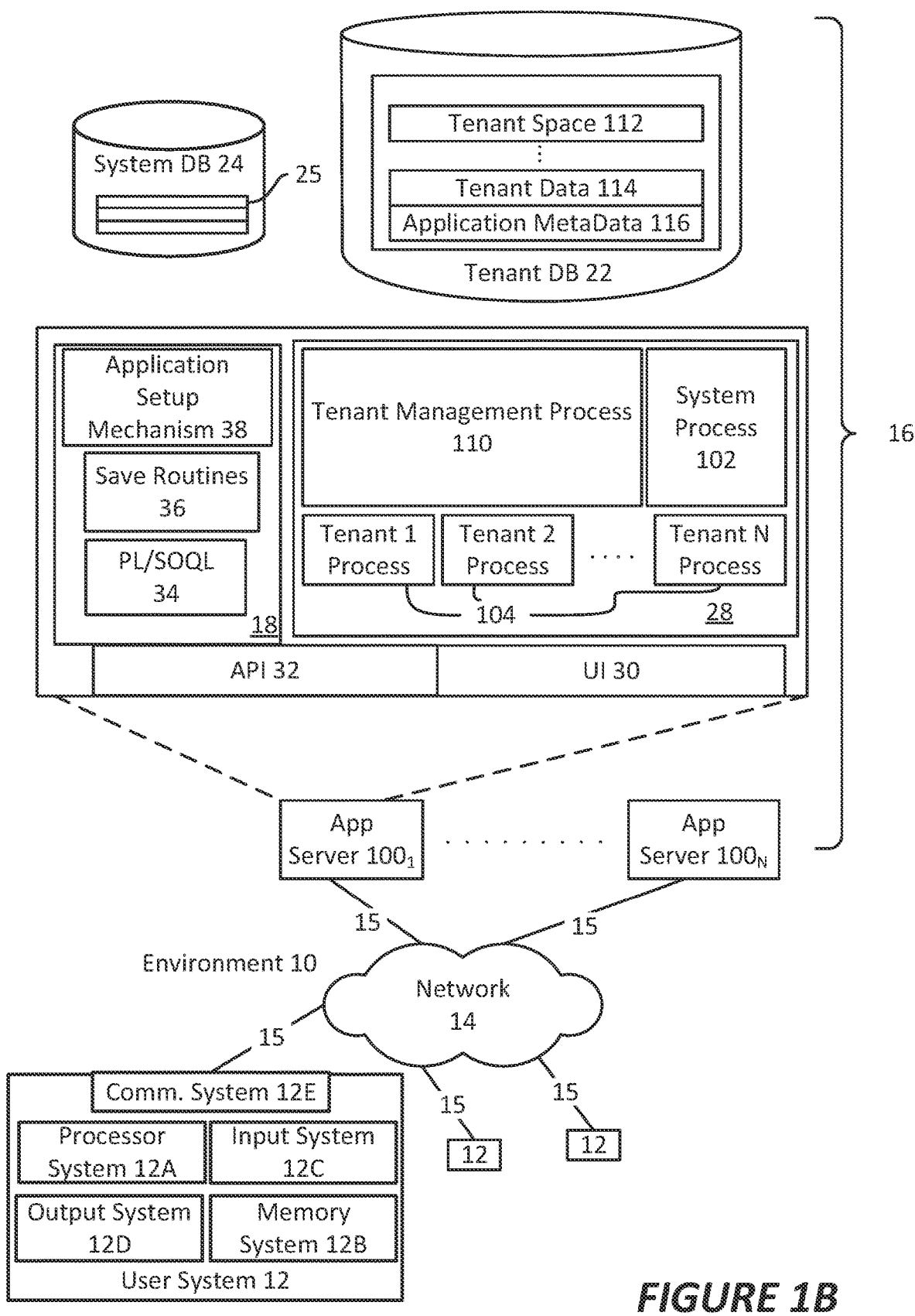
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E. The processor system 12A can include any suitable combination of one or more processors, such as one or more central processing units (CPUs) including single-core or multi-core processors (such as those discussed herein), one or more graphics processing units (GPUs), one or more field-programmable gate arrays (FPGAs), or any other electronic circuitry capable of executing program code and/or software modules to perform arithmetic, logical, and/or input/output operations. The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

The communications system 12E may include circuitry for communicating with a wireless network or wired network. Communications system 12E may be used to establish a link 15 (also referred to as "channel 15," 'networking layer tunnel 15," and the like) through which the user system 12 may communicate with the database system 16. Communications system 12E may include one or more processors (e.g., baseband processors, etc.) that are dedicated to a particular wireless communication protocol (e.g., Wi-Fi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches, filters, amplifiers, antenna elements, and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the database system 16, the user system 12 using the communications system 12E may establish link 15 with network interface 20 of the database system 16.

In FIG. 1B, the network interface 20 is implemented as a set of HTTP application servers $100_1$-$100_N$. Each application server 100 (also referred to herein as an "app server", an "application programming interface (API) server", a "worker node", and/or the like) is configured to communicate with tenant database 22 and the tenant data 114 therein, as well as system database 24 and the system data 25 therein, to serve requests received from the user systems 12. The tenant data 114 can be divided into individual tenant storage spaces 112, which can be physically or logically arranged or divided. Within each tenant storage space 112, user storage (e.g., tenant data 114) and application metadata 116 can similarly be allocated for each user and/or tenant. For example, a copy of a user's most recently used (MRU) items can be stored to user storage. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an API 32 (or a web server (WS) 32) to system 16 resident processes to users or developers at user systems 12. As examples, the API 32 may be a Representational State Transfer (REST or RESTful) API, Simple Object Access Protocol (SOAP) API, Apex API, and/or some other like API. As examples, the WS 32 may include Apache® Axis1.4 or Axis2, Apache® CXF, JSON-Remote Procedure Call (RPC), JSON-Web Service Protocol (WSP), Web Services Description Language (WSDL), XML Interface for Network Services (XINS), Web Services Conversation Language (WSCL), Web Services Flow Language (WSFL), RESTful web services, and/or the like. In some other implementations, the environment 10 may not have the same elements as those listed above or may have other elements instead of, or in addition to, those listed above.

Each application server 100 can be communicably coupled with tenant database 22 and system database 24, for example, having access to tenant data 114 and system data 25, respectively, via a different network connection 15. For example, one application server $100_1$ can be coupled via the network 14 (for example, the Internet), another application server $100_{N-1}$ can be coupled via a direct network link 15, and another application server $100_N$ can be coupled by yet a different network connection 15. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. In this regard, each application server 100 may be configured to perform various database functions (e.g., indexing, querying, etc.) as well as formatting obtained data (e.g., ELT data, ETL data, etc.) for various user interfaces to be rendered by the user systems 12. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (e.g., an application server 100 in the system 16) can automatically generate one or more SQL statements (e.g., one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. As used herein, a "database object", "data object", or the like may refer to any representation of information in a database that is in the form of an object or tuple, and may include variables, data structures, functions, methods, classes, database records, database fields, database entities, associations between data and database entities (also referred to as a "relation"), and the like. A "table" is one representation of a data object, and may be used herein to simplify the conceptual description of objects and custom objects according to some implementations. It should be understood that "table" and "data(base) object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
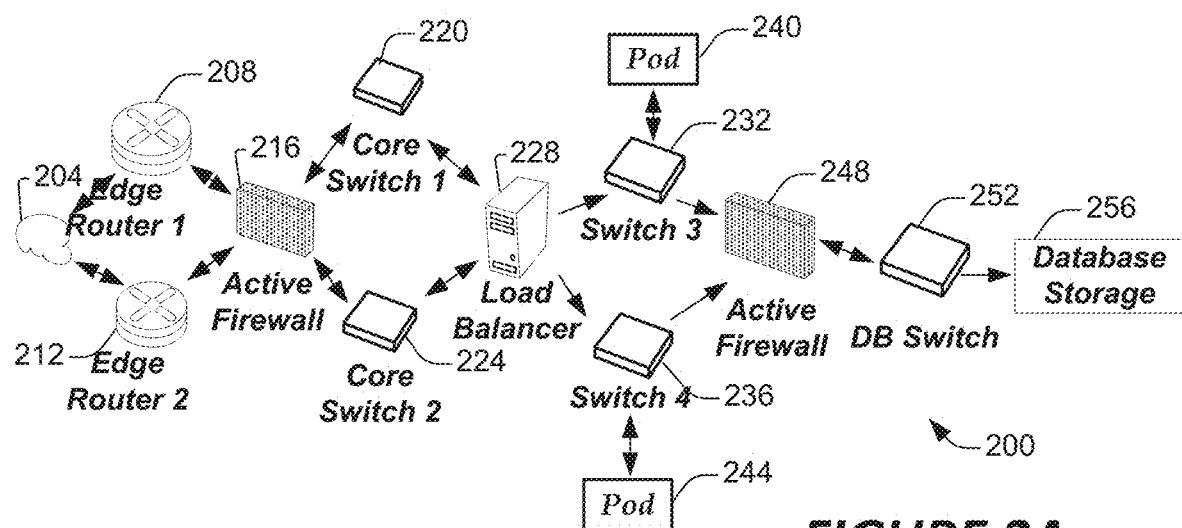
FIG. 2A shows a system diagram of example architectural components of an on-demand database service environment according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, hardware time or usage, electrical power, input/output operations, ports or network sockets, channel/link allocation, throughput, and/or the like. As used herein, the term "network resource" may refer to computing resources that are accessible by computer devices via a communications network. Communication with the pods can be conducted via pod switches 232 and 236. Components of the on-demand database service environment can communicate with database storage 256 through a database firewall 248 and a database switch 252.

Figure 2B:
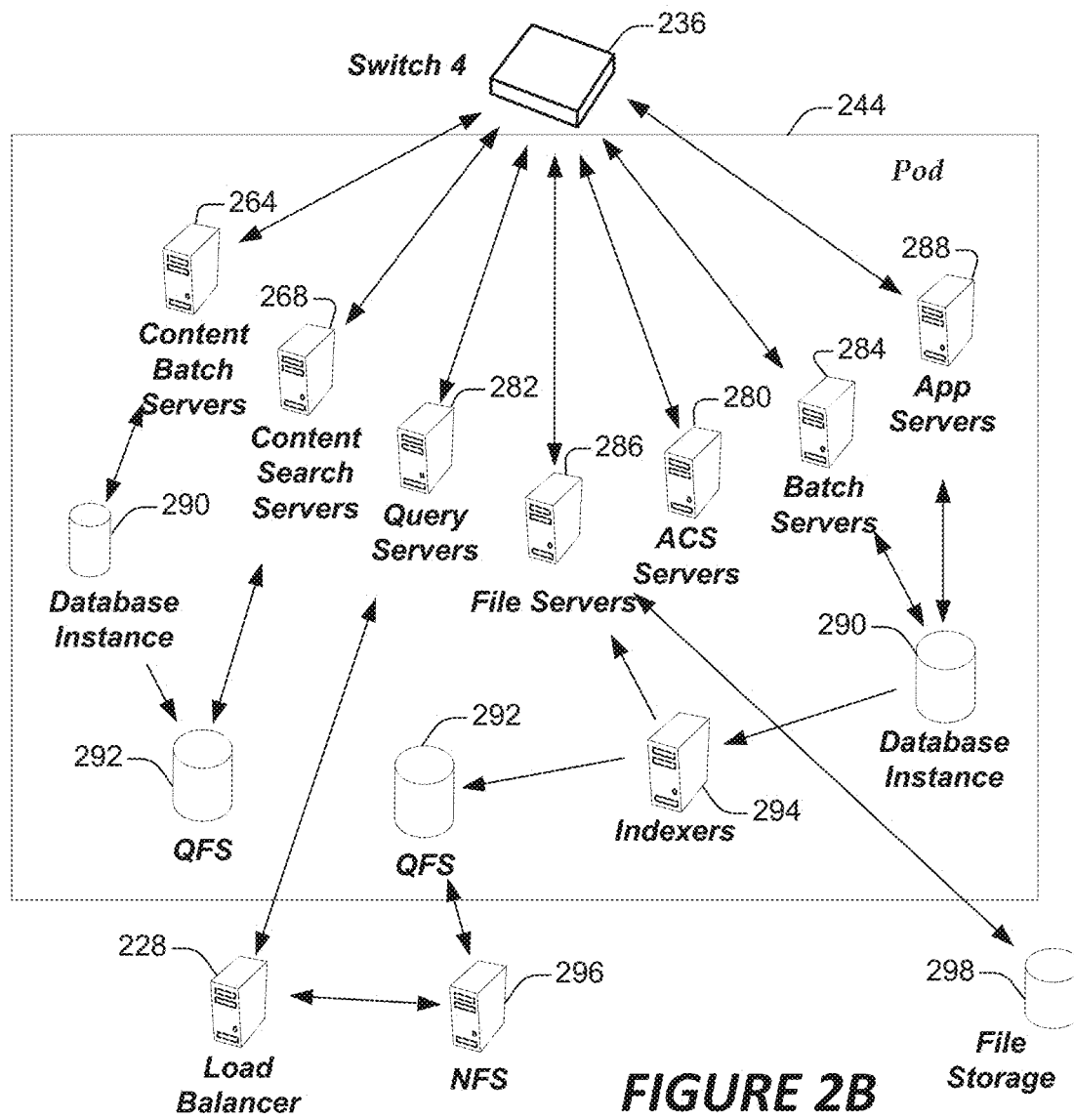
FIG. 2B shows a system diagram further illustrating example architectural components of an on-demand database service environment according to some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file force servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods. In various implementations, the app servers 288 may be the same or similar to the app servers 100 discussed herein.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file servers 286 can manage requests for information stored in the file storage 298. The file storage 298 can store information such as documents, images, and basic large objects (BLOBs). By managing requests for information using the file force servers 286, the image footprint on the database can be reduced. The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, a QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database 290 or QFS 292. The index information can be provided to file force servers 286 or the QFS 292.

II. Message Sends

Figure 3:
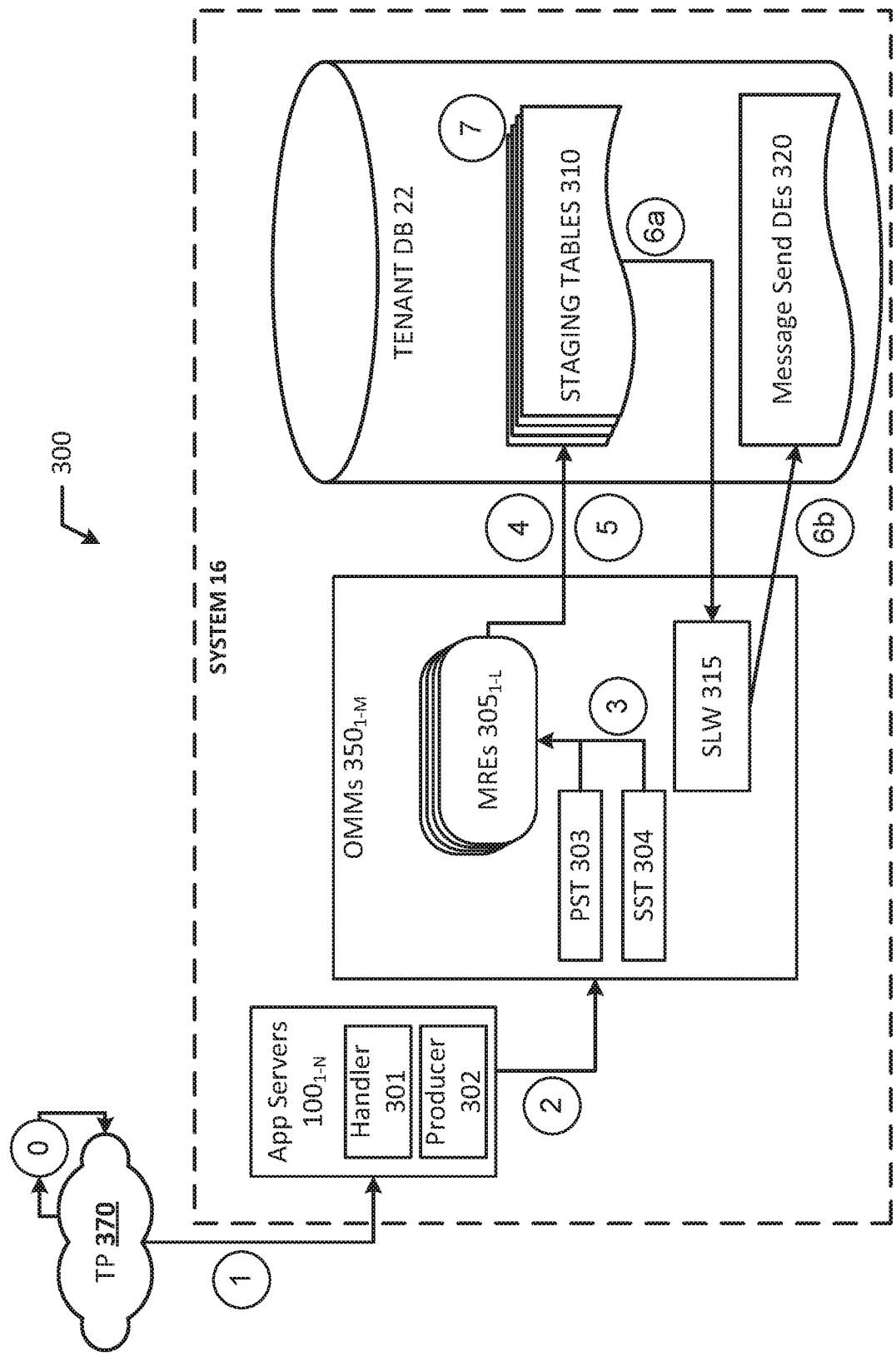
FIG. 3 shows an arrangement in which various embodiments discussed herein may be practiced.

FIG. 3 shows an arrangement 300 in which the components of the database system 16 may interact with components of a user system 12 and one or more tenant platforms (TPs) 370 in accordance with various embodiments. In FIG. 3, like numbered items are as described with respect to FIGS. 1A-2B (although not all items shown by FIGS. 1A-2B are shown by FIG. 3). In the example shown by FIG. 3, the database system 16 may implement app servers $100_{1-N}$ (collectively referred to as "app servers 100" or as an "app server 100"), one or more Outgoing Message Managers (OMM) $350_{1-N}$ (collectively referred to as "OMMs 350" or "OMM 350") which may interact with the tenant DB 22 discussed previously.

Referring to FIG. 3, the TPs 370 (also referred to as "message sending platforms," "client platforms," or the like) may be a tenant of the database system 16 (e.g., a customer or organization (org), or developers associated with the customer/org) that may develop applications and/or platforms that interact and/or integrate with the database system 16 and utilize data from an associated tenant space in tenant DB 22. The TP 370 may obtain data from the associated tenant space to render/display visual representations of relevant tenant data. In some cases, the applications/platforms may utilize tenant data for interacting with user systems 12 by, for example, sending messages to various user systems 12 (e.g., subscribers of the TP 370) via the database system 16. To do so, the TP 370 may operate/implement program code or script(s) that call an API or utilize a web service to create and execute the sending of these messages based on various triggering events.

The messages to be sent to individual recipients may be referred to as "message sends," "sends," and/or the like. A "message send" may be an individual message sent to one or more recipients (e.g., a subscriber, client, customer, etc. operating user systems 12), and may include, inter alia, emails, push notifications, Short Message Service (SMS)/Multimedia Message Service (MMS) messages, over-the-top (OTT) messages, audio message, video message, and/or any other suitable message type.

As mentioned previously, in order to send messages to intended recipients the owner/operator/developers of a TP 370 may develop program code, script(s), etc. to define particular messages to be sent to intended recipient(s) based on particular interactions with the TP 370 (e.g., node 0). This code/script(s) may be referred to as a "send definition," "message definition," "MSR definition," "send template," "send configuration," "send classification", and the like. The send definition may be a configuration or policy that is used to send and track built messages. The send definition may define various parameters for message send jobs that may be reused for multiple message sends or interactions/events. The send definition may include content to be sent when a particular trigger event occurs. For example, the TP 370 (or associated developers) may set rules to generate personalized media and/or dynamic content for particular users/clients/customers, and in some implementations, whether the TP 370 is to review message sends before they are sent to their intended recipients.

The system 16 may generate and send the particular message when the defined interaction with the TP 370 is detected to have occurred. The interactions and/or events defined by a send definition can be tenant-initiated or triggered based on one or more triggering events. A tenant-initiated messages may be sent to tenant-identified subscribers at a tenant-specified time. As examples, tenant-initiated messages may include periodic (e.g., weekly, monthly, etc.) newsletters, list of offers or advertisements, weather alerts, a low-account-balance alert, or the like. A triggering event (or trigger event) may be any type of event or action, which may or may not be based on a user, device, or system interaction with the TP 370. For example, a trigger event may include completion of an online form, submitting a purchase order, performing a search, abandoning an online form or a shopping cart, failing to login after a number of login attempts, resetting a user name or password, signing up to an email list, requesting more information, etc. Message sends that are based on trigger events may be referred to as "trigger sends" or the like.

Tenants/developers can configure the send definitions or message logging jobs both through a suitable API 32 and/or through a web based graphical user interface (GUI) 30. Where APIs 32 are used, the send definition may be developed using any suitable mark-up or object notation language, such as the various languages, tools, etc. discussed herein. For example, message sends for a newsletter may be initiated by an API 32 or GUI 30, while triggered sends are always initiated using only the API 32. The developed send definition may be pushed or otherwise sent to the system 16 using a suitable API or web service (WS), such as the various APIs/WS discussed herein. The database system 16 may provide a dev-environment, programming language(s), and/or development tools that allows TP 370/developers to create/edit send definitions. Examples of such dev-environment, programming language(s), and/or development tool are discussed with regard to FIGS. 1A-1B. In embodiments, the dev-environment may allow the TP 370/developers to define multiple message sends that the database system 16 may accept via API/WS 32 requests in response to detection of corresponding interactions. For example, the TP 370 may define individual message sends for account balance alerts, account security alerts, account activity acknowledgements, newsletter blasts, etc.

The dev-environment may include destination management tools and reply management tools. The destination management tools may allow the TP 370 or developer to define target recipients (e.g., one or more user systems 12) or user/customer/subscriber lists of recipients to receive the built messages, and particular message delivery mechanisms to be used for building and sending the messages (e.g., using SMS/MMS, OTT, push notifications, email, etc.). The reply management tools may allow the TP 370 or developer to define automatic responses/replies to recipient messages, such as out-of-office replies, auto-replies, and unsubscribe requests received in response to message sends. The dev-environment may also allow the TP 370 or developers to define various send options, which specify how a particular interaction tracks statistics from message send requests (MSRs) and/or built messages.

The dev-environment may also include tools that allow the TP 370/developers to activate or create and define one or more custom database objects (CDBOs) to store custom data. These CDBOs may be referred to as "data extensions." A data extension (DE) may be a table or other like database object within the tenant space 112 of the tenant DB 22 that stores various subscriber-related data, and also maintains an association with a subscriber list which allows unified subscriber subscription and status management, tracking, and reporting. DE message sends may use tenant-defined data as a source for message send recipients.

According to various embodiments, the TP 370/developers may activate/create a DE 320 that is used to automatically log/record details about message sends. The DEs 320 used for message logging may be referred to as "message log data extensions 320," "send log data extensions 320," or the like. To do so, the TP 370/developers may create or develop a send logging definition, which may define various parameters for message send logging jobs (SLJs) or message logging jobs (MSJs), such as the types of data to be logged and the structure of the send log DE 320. The send log definition (also referred to as a "message send log definition," "message log definition," "message logging template," "message logging configuration," "send logging template," and/or the like) may be developed in a same or similar manner as discussed previously with regard to the send definition.

Each row or record in a send log DE 320 may correspond to an individual message recipient and each column or field in the send log DE 320 may correspond to an individual data item or data type of the message sends to be stored in the DE 320. Individual columns/fields of each row/record may include custom data that a particular tenant (e.g., TP 370) would like to log, such as order number, receipt number, confirmation code, coupon code, timestamp, recipient identifying information (e.g., email address, login credentials, etc.), and/or any other type of information that the tenant wants to track. In some implementations, the TP 370 may log an entire message body of a message send or an entire message send (header and body portions) to be sent to each recipient. When enabled or activated, tenant-defined data included in the message sends and/or data about the message sends is logged or otherwise stored in the send log DE 320. According to various embodiments, the send log DE 320 may be automatically populated by the OMMs 350 using a two-operation process, which is discussed in more detail infra.

When a tenant-initiated event or a trigger event occurs, the code/script(s) implemented by the TP 370 may call a suitable API/WS 32 that may cause the system 16 to generate and transmit a corresponding message send to a particular recipient (e.g., node 1). The API/WS 32 may be any suitable API/WS 32, such as those discussed herein. In one example, a RESTful API 32 may be used, where an REST API endpoint accepts message send requests (MSRs) with send time data in a JSON payload. The MSRs may be sent in batches, and in some implementations, the API/WS 32 may include separate calls for single and batch subscriber MSR submissions.

In embodiments, each MSR may include MSR information and an MSR payload. In one example, MSR information and MSR payload may be located in a payload (body) portion of an HTTP message, which may be in HTML, XML, JSON, and/or some other suitable format and variants thereof. Other message types (such as any message type discussed herein) and arrangements of data in such messages may be used in other embodiments. In some embodiments, the MSR information and/or MSR payload may be designed to allow multiple subscribers to be included in a single request to be efficiently broken out and queued as individual entries in one or more queue tables.

The MSR information may include a client identifier (ID) (also referred to as a "tenant ID", "org ID", and the like) that indicates/identifies a tenant platform (e.g., a client of system 16 such as TP 370), an MSR ID that indicates/identifies a universally unique ID (UUID) of the MSR, an MSR Job ID (request ID) that indicates/identifies a UUID of the MSR job and/or the request, and a priority indicator/indication that indicates/identifies a priority of the MSR payload. The priority information may indicate a priority or rank associated with the MSR payload using levels (e.g., high, medium, low), a number scheme (e.g., 1 through 10), or an amount of time to delivery (e.g., by a specified time/date, a specified number of seconds, etc.).

The MSR payload may include both recipient specific attributes that are used to build a personalized message from the send definition, fully rendered content specific to the recipient, or some combination thereof. The MSR payload may be located in the payload (body) portion of an HTTP message and may be in HTML, XML, JSON, and/or some other suitable format and variants thereof. For example, the MSR payload may include a send definition or a send definition ID. The send definition ID may indicate a location/address of a send definition associated with the TP 370, which may be used to access the send definition to build a message for intended recipients.

The app server 100 may accumulate MSRs (e.g., at node 1), and may store MSR information and/or MSR payloads in one or more message send job queues (MSJQ) (not shown by FIG. 3), which may be processed when an OMM entity 350 periodically checks the MSJQ to discover available message send processing jobs. The MSJQ may be one or more database objects in a local memory of the app server 100, one or more datastores separate from the app server 100 (not shown by FIG. 3), or some combination thereof. The MSJQ may be used to store various MSR information/MSR payloads in association with various other information, which may be stored in the tenant DB 22, the system DB 24, or a combination thereof. In one example, MSR information may be stored in a first datastore and the MSR payloads may be stored in a second datastore.

The datastores may comprise one or more data storage devices that act as a repository for persistently storing and managing collections of data according to a predefined database structure. In some embodiments, the datastore(s) may include one or more distributed datastores and/or one or more non-relational datastore(s). The distributed datastore(s) may comprise a network of a plurality of data storage devices. The non-relational datastore(s) may employ a non-relational distributed database structure (sometimes referred to as a NoSQL database) that includes various database objects that are not stored using relations. In one example, the distributed datastore(s) may be used to store MSR information and the non-relational datastore(s) may be used to store MSR payloads (e.g., HTML, XML, JSON payloads, etc.), which may include both recipient specific attributes that are used to build a personalized message from a send definition/template/configuration, fully rendered content specific to the recipient, or some combination thereof. In another example, the database objects stored in the datastore(s) may be immutable (e.g., once created and populated, such objects cannot change their form) and accessible using a suitable scripting language (e.g., Apache™ Pig™ Latin). Examples of the datastore(s) may include Gridforce provided by Salesforce.com®, BigObjects provided by Salesforce.com®, HBase™ provided by Apache™ Software Foundation which runs on top of Apache™ Hadoop®, BigTable provided by Google®, and/or the like.

To perform at least some functions of the embodiments discussed herein, each of the app servers 100 may implement an API handler 301 (also referred to as "handler 301") and a producer component 302 (also referred to as "producer 302"). Instances of the handler 301 and the producer 302 may be implemented in a process space of the app server 100 (e.g., process space 28 and/or system process space 102 shown and described with respect to FIGS. 1A-1B).

The handler 301 may be used to perform verification procedure(s) on MSR information and MSR payloads of received MSRs. In the example of FIG. 3, the handler 301 may perform a light weight validation to confirm that required data elements are present in the MSRs obtained from the TP 370; whether the message includes valid syntax; etc. The handler 301 may validate the MSRs by loading the MSR information and/or MSR payload, and performing in-memory checks against cached data. The handler 301 may pass the MSRs to the producer 302 to determine the particular database (or database object(s)) hosting the MSJQ for the sending client (e.g., TP 370).

The producer 302 may maintain a local cache that maps MSRs to MSJQs. The map may indicate a (physical or virtual) memory location of the MSJQ(s), destination information (e.g., socket, port number, address, etc.) of the datastore that stores the MSJQ; and/or other like parameters for storage of the MSR information and MSR payloads. The producer 302 may write the MSR information and/or MSR payloads to a particular database object or datastore to be processed by an OMM 350 (e.g., node 2). To provide the MSR information and MSR payloads for storage, the producer 302 may package the MSRs in any suitable message format, such as an HTTP message, a WebSocket message, an Internet Application Protocol (IAP) message, an Extensible Messaging and Presence Protocol (XMPP) message, or the like. The MSR information and/or MSR payloads in such a message may be located in a header or a payload (body) portion of these messages, and the payload of these messages may be in HTML, XML, JSON, MessagePack™, and/or some other suitable format and variants thereof.

The producer 302 may directly inject the MSR information/payloads into the primary slots/threads (PST) 303, and/or the MSR information/payloads may be pulled into the secondary slots/threads (SST) 304 by the OMM 350. The PST 303 may be one or more database objects stored in a local memory of an OMM 350, and may be referred to as an "in-memory queue," "in-memory MSJQ," or the like. The SST 304 may be a locally stored version of an MSJQ, or portions thereof, which is obtained by the OMM 350 during pull processing. In some embodiments, the OMM 350 may implement individual PSTs 303 and SSTs 304 for individual tenants, each of which may be referred to as a "consumer process" or an individual "instance of a consumer process." Further, the PST 303 and/or SST 304 of each consumer process instance may have a configured size, storage limit, threshold, etc. which can be adjusted based on various criteria, subscriber data, current or previous resource utilization, and/or the like.

The OMMs 350 may comprise one or more pools of servers (also referred to as "message servers"), associated data storage devices, and/or other like computer devices dedicated to running/executing message management/processing processes, procedures, mechanisms, etc. These message servers may include the same or similar processor systems, memory systems, network interface, and other like components as the app server 100 or other computer systems discussed herein. In embodiments, the OMMs 350 may process the content of messages received from various entities of the system 16 to transform such messages into a desired outgoing message format. For outgoing messages, the OMMs 350 may convert the messages from an internal format/representation used by the entities of the system 16 to a format that can be consumed by external entities (e.g., user systems 12). According to various embodiments, the OMMs 350 may comprise message building mechanisms and message logging mechanisms.

II.A Message Building Mechanisms

Each OMM 350 may include one or more message rendering entities (MREs) 3051-L (collectively referred to as "MREs 305" or "MRE 305"), where L is a number. The MREs 305 may include or operate various message processing applications and protocols to generate and transmit the messages. The MREs 305 may generate messages based on MSRs and send definitions. The MREs 305 may send the generated messages to individual recipients, such user systems 12, or the MREs 305 may provide the generated messages to a suitable system or application to be sent to the intended recipients. For example, the MREs 305 may be or operate mail transfer agent (MTA) applications to receive and transfer email messages to/from various user systems 12 in accordance with Simple Mail Transfer Protocol (SMTP), extended SMTP, Post Office Protocol 3 (POP3), Internet Message Access Protocol (IMAP), and/or some other suitable email protocol. In another example, the MREs 305 may provide push notification services using Webpush, HTTP server push, WebSockets, etc. to provide push notifications to various user systems 12. In another example, the MREs 305 may act as External Short Messaging Entities (ESMEs) that implement SMS server/gateway applications and/or implement the Short Message Peer-to-Peer (SMPP) protocol to send/receive SMS/MMS messages to user systems 12 via Short Message Service Centers (SMSC). In another example, the MREs 305 may implement various streaming technologies or protocols to generate and broadcast audio or video data, and/or send/receive OTT messages.

When an MSR is obtained by the app server 100 (e.g., based on a subscriber interaction), a message send processing job may be created, for example, when the app server 100 queues the MSR information/payload in an MSJQ. When a message send processing job is created, an OMM 350 or a slot of the OMM 350 (e.g., PST 302 or SST 303) may select and validate the job at a time when the job is scheduled to be processed, such as when the job is in a highest position in the MSJQ (or when the job is published and activated for triggered sends). A job may be a row, record, or other like database object that stores various values, statistics, metadata, etc. during the lifecycle of the message send, and which may be used for processing the job. Each job may include various fields for storing relevant MSR information, such as a job or request ID (JobID or requestID) field, a client ID (clientID or org_id) field, a message send ID (msID) field, a priority field, schedule information field, a payload field, send definition ID (sendDefinitionID) field, job status field, and/or the like fields. In some embodiments, the jobID or requestID in the JobID/requestID field may be generated using any suitable mechanism, such as a pseudo-random number generator, an MSR count value associated with the org_id, a hash of any of the contents of any other field using a suitable hash function, or the like and/or combinations thereof. The job may include more or less fields depending on a type of MSR and/or where the job is to be stored.

Once the job data is loaded into a slot of the OMM 350 (e.g., PST 302 or SST 303), an MRE 305 may build a message template for use in generating message sends for the job based on the job data and/or send definition indicated by the MSR information. In various embodiments, the MREs 305 may build the content for all message types and non-message content such as landing pages (sites) and platform applications, and may support a rich set of options for personalizing content. Examples of personalized content supported by the MREs 305 may include Dynamic Content Areas as created by the TP 370 using content creation tools provided by the system 16; simple substitutions to perform basic mail merge type functionality based on TP or subscriber attributes, or send DE data; function-based substitutions to allow the fetching and/or manipulation of data being merged into the content; inclusion of dynamically generated links; dynamic inclusion of local and/or remote (syndicated) content retrieved from one or more DEs, saved content areas, or external sources; and the execution of one or more supported scripting languages such as JavaScript, AMPscript, Mustache Template Language, Handlebars Template Language, GTL, and/or any other scripting language, such as those discussed herein.

The MRE 305 may also wrap various links in fixed content so that user clicks on those links can be tracked, place client specific tracking pixels in the content, retrieve any job level syndicated content, and normalize the content for transport using a desired message mechanism. The MRE 305 may compile subscriber lists for the message sends by scrubbing or cleansing the list based on our various list management mechanisms (e.g., subscriber status, suppression lists, global unsubscribe lists, etc.). The MRE 305 may also insure that each recipient is associated with a publication list for the message send. In some embodiments, the MRE 305 may compile seed lists, which are lists made up of a set of managed email addresses, and monitor deliverability statistics for the job.

As alluded to previously, the OMMs 350 may use a dedicated implementation of the slot architecture to build and send messages to intended recipients. In such embodiments, each OMM 350 may determine the number of mail server slots (e.g., instances of PST 302 and/or SST 303) and a priority of the mail server slots that the job qualifies for based on job size, job priority, send definition, subscriber data, or other like parameters/criteria. These slots are then allocated to allow the job to be scaled across the available OMMs 350 in a target mail server cluster (referred to as "send spreading"). Each slot queued for message send processing is picked up by an OMM 350 (or individual slots of an OMM 350) in a target OMM cluster according to a current capacity and message send priority. Each slot goes through a cycle of claiming a batch of jobs from the MSJQ, providing the jobs and/or message data to an MRE 305 to build messages of the jobs in the claimed batch, and injecting the built messages to one or more Message Transfer Agents (MTAs) (not shown by FIG. 3) for delivery using a recipient address (e.g., IP addresses) based on the send definition and send type. This data fetch, build, and injection process is highly optimized and each of fetch, build, inject phases may run in parallel. For triggered sends, the primary slot 303 may monitor the depth of the MSJQ and may launch additional slots or slot instances (send spreading) as needed based on the Triggered Send priority and send definition/configuration. Special message send types, such as pre-built (delayed delivery) message sends and domain-based message sends, may be built and saved to other queues for later delivery by one or more OMM delivery slots (not shown by FIG. 3). Once all jobs in a particular batch have been processed, the OMM 350 may raise any events that have been registered with the message send (referred to as "Post Send Callouts"). Additionally, when the job is completed, the job status field may be set to a value that indicates a complete status and the job slot may be archived.

In some embodiments, the MREs 305 may send the built message to a BIND server (or implement a BIND application/service) to send the built message over a TCP/IP connection (e.g., using the bind( ) function with the recipient IP address and/or TCP port). As used herein, the term "BIND server" may be one or more servers or other suitable computer system(s) that is/are capable of sending SMPP BIND commands used for sending SMS/MMS messages. Examples of such servers may include Wireless Application Protocol (WAP) proxy servers, External Short Message Entity (ESME) servers (e.g., a WAP proxy server, e-mail gateway/server, voicemail server, etc.), a tunnel server, and/or a system of such computer devices. In embodiments, the MREs 305 may send the built message to an aggregator (or implement an aggregator application/service, message-oriented middleware, mediation engine, etc.) to send the built message over an HTTP, WebSocket, or some other suitable connection. In embodiments, the MREs 305 may send the built message to an SMS server/gateway (or implement an SMPP/ESME service/application) to send the built message as SMS/MMS messages. In some embodiments, built messages sent to the aggregator may be sent to the SMS server/gateway for transmission via SMS/MMS, or the built messages sent to the BIND server may be sent to the aggregator, which may then be sent to the SMS server/gateway for transmission via SMS/MMS.

II.B Message Logging Mechanisms

As mentioned previously, the TP 370 may create a message send DE 320 using a send logging template or send logging definition, and the message send DE 320 may be automatically populated by the OMM 350 with a row/record for each message recipient.

Typically, each OMM 350 would implement one or more worker processes to write message log data one batch segment (e.g., 1 to 50 messages) at a time from each slot (parallel processing thread) prior to the MREs 305 building the corresponding message sends. Jobs with a large number of slots produced a large number of simultaneous write operations in batch segments that tended to have 50 or fewer rows. This created significant contention and pressure on the tenant DB 22 resulting in message log writes to be a predominate factor in message transmission delay. This delay may be problematic since many of the message sends may be time sensitive, and the delay may also adversely affect other tenant processes. Furthermore, the delay in message transmission may also cause bottleneck and/or overload issues to arise as more message send logging jobs are queued in the MSJQ, further increasing the message transmission delay and exacerbating the aforementioned issues.

According to various embodiments, the OMMs 350 may implement a two-staged process for logging message data to reduce message transmission latency and to avoid the aforementioned bottleneck and overload-related issues. In a first stage of the two-staged process, the OMM 350 may store some or all of the message send data to be logged in separate staging tables 310 as the OMM 350 is preparing the message send for that job. The staging tables 310 may be job-specific and write optimized DBOs that are used to temporarily store the message send log data prior to storing the message send log data in a corresponding message send DE 320. In these embodiments, the OMMs 350 may operate individual MCSPs/MREs 305 to automatically create one or more staging tables 310 in the tenant DB 22, and may write to the staging table(s) 310 as messages are being constructed and sent rather than directly to the corresponding message send DE 320 prior to message construction. In embodiments, the MREs 305 may construct individual staging tables 310 based on the structure and/or type of the message send log data and/or a structure of the message send DE 320.

The type of send logging available for a group or cluster of OMMs 350 may be specified using a send logging setting associated with a mail cluster ID (MID) of the group/cluster of OMMs 350. Example send logging setting values are shown by table 1.

TABLE 1 example send logging settings

| SEND_LOGGING setting | Behavior |
|---|---|
| 0 | Send logging is not active |
| 1 | Standard send logging is active for the account |
| 2 | Write optimized delayed write send togging is available for the tenant and will be used if a job is qualified as determined by send size and type. |

The send logging setting may control the message send logging behavior performed by the OMM 350. The OMM 350 may automatically determine which type of send logging may be used for the TP 370 when the two-stage write option is enabled. In the example of table 1, when the send logging setting associated with an MID of the OMM 350 is set to "0", the OMM 350 may not log any message send data for the TP 370; when the send logging setting associated with the MID of the OMM 350 is set to "1", the OMM 350 may log message send data for the TP 370 according to normal procedures; and when the send logging setting associated with the MID of the OMM 350 is set to "2", the OMM 350 may log message send data for the TP 370 according to the two-stage process of the embodiments discussed herein.

In some implementations, when the two-stage send logging option is available for a tenant (e.g., a send logging setting of "2" for the TP 370), the OMM 350 may determine whether the send logging is to be used based on a configurable number of subscribers/recipients, which may be indicated by a candidate list produced during the list building stage of message send job processing or indicated by a send definition. If the number of recipients meets or exceeds the configured (threshold) number of subscribers/recipients, then the OMM 350 may operate the two stage process for logging the message send data. The configuration indicating the threshold number of subscribers/recipients may be set at the stack level (e.g., SystemDB.dbo.OMMSettings, MinSubscriberCountForTwoStepSendLogWrite column value) and may be set to a default value if not configured. As an example, the default number of subscribers/recipients may be 10,000 subscribers or some other suitable number. This can be overridden at the MID level through standard OMM setting mechanisms.

When the two-stage message logging process activated for a particular OMM 350 or cluster of OMMs 350, the OMM(s) 350 may operate as follows:

At node 0, the TP 370 may develop a send definition, which may then be pushed or otherwise stored by the system 16. At node 1, subscriber interactions with the TP 370 may cause the TP 370 to generate and send MSRs to the app server 100. At node 2, the app server 100 may queue the MSR information and payloads in an MSJQ, which are then periodically obtained by a slot 303/304 of an OMM 350 for processing. At node 3, the MSR data may be obtained by one or more MREs 305 to build the message as discussed previously, and the MREs 305 may also initiate the message send logging process.

In various embodiments, a message send logging job (SLJ) may be created for each message send building/construction job and/or for each MSR, and the SLJ may have its own state table or other like database object (e.g., dbo.JobSendLog) in the tenant DB 22. The dbo.JobSendLog may include columns/fields for each slot of an OMM 350 that is processing send logging data, a SLJ status, an approximate count of the number of rows/records that have been published, a completed time, and the like. An example of the data elements of the dbo.JobSendLog is shown by table 2.

TABLE 2 example dbo.JobSendLog

| Column Name | Type | Null | Default |
|---|---|---|---|
| JobSendLogID | bigint | | IDENTITY |
| EID | bigint | | |
| MID | bigint | | |
| JobID | bigint | | |
| OMMSlotID | bigint | X | |
| JobSendLogStatusID | tinyint | | |
| CompleteCount | int | | ((0)) |
| CreateDate | datetime2(4) | | (sysdatetime( )) |
| CompleteDate | datetime2(4) | X | |

Compression State: Row

In the example of table 2, the JobSendLogID may be a unique identifier of an SLJ associated with a message send job; the enterprise ID (EID) may be a unique identifier associated with a particular tenant (e.g., TP 370), the MID may be a unique identifier associated with an OMM cluster of the OMM 350; the JobID may include a JobID or requestID of the MSR; the OMMSlotID may be a unique identifier of a slot in which the MSR information/payload is stored (e.g., an identifier associated with a PST 303 or SST 304) or a unique identifier associated with a consumer process (e.g., an individual MSR 305) that is to obtain and process the MSR; the CompleteCount may indicate a number of message send records (or an amount of message send logging data) that have been transferred out of a staging table 310 (discussed in more detail infra); the CreateDate may indicate a time and date when the SLJ is started (e.g., when a process for generating the staging tables 310 is started, such as at node 4); and the CompleteDate may indicate a time and date when the SLJ is completed (e.g., when the message send logging data is finished being moved from the staging tables 310 to the message send DEs 320). In some embodiments, the JobSendLogID in the JobSendLogID field may be generated using any suitable mechanism, such as a pseudo-random number generator, an MSR count value associated with the org_id of the TP 370, a hash of any of the contents of any other field using a suitable hash function, or the like and/or combinations thereof. The information of table 2 may be displayed in a Job Detail form discussed infra.

Additionally, the dbo.JobSendLog may include one or more indexes, which may be used to look up data during the data logging process. An example of the index information for the dbo.JobSendLog is shown by table 3.

TABLE 3 example Index Information for dbo.JobSendLog

| Cl | Un | PK | Cmpr | Index Name | Columns |
|----|----|----|------|------------|---------|
| X | X | X | Row | PK_JobSendLog_JobID | JobID |
| | | | Row | IX_JobSendLog_JobSendLogStatusID_CreateDate | JobSendLogStatusID, CreateDate |

In table 3, the index name may correspond to a particular column/field of the dbo.JobSendLog that is to be used as the index. In this example, the PK JobSendLog_JobID may be used to look up an individual SLJ by the JobID. The IX_JobSendLog_JobSendLogStatusID CreateDate may be used to look up an individual SLJ by a corresponding SLJ status (JobSendLogStatusID), for example, in order to monitor for errors (e.g., code 110 in table 4 infra).

As shown by table 2, the dbo.JobSendLog may have an dbo.JobSendLogStatus field or data element, which may indicate a current status or state of the dbo.JobSendLog. Example SLJ status values or codes that may be stored in the dbo.JobSendLogStatus are shown by table 4.

TABLE 4 example Send Logging Job status identifiers

| JobSendLogStatusID | Status | Description |
|--------------------|--------|-------------|
| 10 | Processing | Two step send logging write in process |
| 20 | Complete | Two step send logging write process complete |
| 100 | Paused | Two step send logging process paused |
| 110 | Error | Two step send logging processing error |
| 120 | Canceled | Two step send logging process canceled |

In the example of table 4, the dbo.JobSendLogStatus may be set to have a value of "10" while the OMM 350 is currently processing an SLJ (e.g., while creating the staging tables 310, while storing data in the staging tables 310, and/or while moving data from the staging tables 310 to the message send DEs 320). In various implementations, the dbo.JobSendLogStatus may not be set to have a value of "20" until all of the data is moved from the staging tables 310 to the message send DEs 320.

Referring back to FIG. 3, at node 4, the MRE 305 may generate or create a job-specific staging table 310 for the SLJ in the tenant DB 22. The staging table 310 may be a temporary DBO used to store message send logging data while the corresponding message is being built by the MRE 305. In some embodiments, the MRE 305 may create the staging table 310 when list building is to take place during the message construction process. In one example implementation, a server object, dbo.spOMMCreateSendLoggingStagingTable, when executed, may cause the MRE 305 to create the staging tables 310.

In embodiments, the staging table 310 may be created with the same schema as the target send log DE 320 minus any deleted columns and non-writable columns/fields, such as computed and timestamp columns/fields. According to various embodiments, the MRE 305 may create the staging table 310 with a clustered index on an identity/identifier column/field of each staging table 310. The clustered indexes may sort and store rows/records in the staging tables 310 based on their key values.

Additionally, the MRE 305 may create the staging tables 310 to have a non-clustered index on various fields, such as a job identity (JobID) field, a list identity (ListID) field, a batch identifier (BatchID), a subscriber (SubscriberID or org_id), a user or recipient ID (user_id), or any combination thereof. The non-clustered indexes may have a structure separate from the rows/records of the staging tables 310 that may contain non-clustered index key values, wherein each key value entry has a pointer to the rows/records that contain the key value. The non-clustered indexes may be used to support OMM 350 retry logic for interrupted batches and a sort used by the publisher/producer component 302. In some implementations, the staging tables 310 may follow any suitable naming convention, for example, dbo.TempJobSubscriberJob[nnnn]_SendLog—where [nnnn] represents the JobID. In one example implementation, a server object, dbo.spOMMGetTempJobSendLogTableName, when executed, may return the name of a staging table 310.

According to various embodiments, the staging table 310 may be segmented into multiple partitions to reduce write contention through a computed column that automatically distributes write operations evenly. In some embodiments, the MRE 305 may partition the staging table 310 into a number of partitions based on a modulus of an identity value of the identity index, which is an automatically incremented integer value assigned as rows that are inserted into the staging table. In one example, the MRE 305 may partition the staging table 310 into ten partitions using a server object pfn_SendLog_Modulo_10 to partition the staging table 310 according to the partition scheme ps_SendLog_Modulo_10. In this example, ps_SendLog_Modulo_10 may be a partition scheme that partitions or otherwise separates each staging table 310 into 10 partitions based on a modulo operation of the jobID, and the pfn_SendLog_Modulo_10 may be a partition function that partitions/separates each staging table 310 into the 10 partitions based on the modulo operation of the jobID. In alternate embodiments, a single partition might be targeted by each individual producer slot based on the slots ordinal within the total number of producer slots for an individual job. In this example, if there are 10 partitions, each slot with a modulus of 0 for the slot ordinal divided by 10 would write to partition 0, producer slots with a modulus of 1 for the slot ordinal divided by 10 would write data to partition 1, and so forth. The MRE 305 may use any suitable partitioning or sharding function in other embodiments.

At node 5, the MRE 305 may write some or all of the send log data to the staging table 310 (or individual partitions of the staging table 310). In some embodiments, this write operation may be performed in the same manner that the OMM 350 uses to write data to the send log DE 320 during the original send logging procedure. In one example, the MRE 305 may perform chunking operations to write the send log data to individual staging table 310 partitions in sets of one or more chunks. In some embodiments, the MRE 305 may validate the data to determine if data privacy or encryption should be applied to the write operation, and/or the MRE 305 may check the send log status of the OMM 350 (see e.g., table 1) prior to writing the data to the staging table 310. Nodes 4 and 5 may represent the first stage of the two-stage send logging procedure.

The second stage of the of the two-stage send logging procedure may begin at node 6. At node 6, an axillary send log writer slot (SLW) 315 (the send long writer 315 may also be referred to as a "message log writer 315" or "MWL 315") may move the data from the staging tables 310 to the message send DEs 320. In particular, at node 6a, the SLW 315 may obtain the send log data from the staging tables 310, and at node 6b, the SLW 315 may write the obtained send log data to the corresponding message send DEs 320. The SLW 320 may be a special type of OMM slot worker may move all of the data in the staging send log table to the send log data extension through repeated publishing operations. In some embodiments, the SLW 315 may be queued to run during the OMM slot allocation stage of the message building process.

The SLW 315 may use any suitable storage mechanism to store the message send data in the message send DE 320. In embodiments, multiple SLW 315 instances may be instantiated to write data to the DE 320 in parallel or in a predefined order. Each SLW 315 instance may be a background process that runs while the message construction process (e.g., the MREs 305) construct and send messages. In one example implementation, a server object, dbo.spOM-MPublishSendLogData, when executed, may cause the SLW 315 to publish the data from a staging table 310 to a corresponding send log DE 320. In an example, at node 6a, the SLW 315 may take a high water mark (HWM) of the staging tables 310 based on the clustered index identity value. The HWM may represent a boundary between used and used space in the staging tables 310. The HWM may be a number of memory blocks that had at least once contained data regardless of whether that data has been deleted or not (e.g., total number blocks of a DBO minus the number of used blocks of that DBO). In this example, at node 6b, the SLW 315 may publish the send log data between the last published identity value and the HWM by partition. This process may be interruptible and may be paused and resumed as desired. Once the data is moved up to the HWM, the SLW 315 may transition to an idle mode or idle state for a configurable number of seconds and then repeat the process.

In embodiments, the SLW 315 may automatically monitor the SLJ processing to keep itself alive as long at the message send job is sending. Additionally, the SLW 315 may also automatically pause and resume itself when its work is caught up and the SLJ is paused and resumed. Furthermore, the SLW 315 may set itself as "complete" and clean up the staging table 310 when it detects that the SLJ is complete or has been canceled.

As mentioned previously, the MRE 305 may create the staging tables 310 to have a non-clustered index to support OMM 350 retry logic for interrupted batches and/or a sort used by the publisher/producer component 302. In various embodiments, interrupts may be handled as follows: (A) if the interrupt is due to an OMM 350 being shut down or due to all work on the OMM 350 being released, the SLW 315 or the SLJ may be moved to another OMM 350; (B) if an SLJ is paused by the TP 370 or through a Job Explorer tool (discussed infra), the SLW 315 may run a publish event to move all of the existing send log data to the send log DE 320, the SLW 315 may release itself once all of the send log data is transferred to the send log DE 320, and the SLW 315 may automatically be resume operation when the SLJ is resumed; (C) if the SLJ publish process is paused, the SLJ may continue processing and only the SLJ publish process may be paused, and the SLJ publishing process can be resumed even if the SLJ itself is complete; (D) if the SLJ is canceled, the SLJ publish process may complete publishing the send log data for the subscribers that were processed by the SLJ and then set itself as complete; (E) if the SLJ goes to the "error" status, the SLJ process may idle until the job is resumed or cancel, and when resumed, the SLJ may then complete the publishing of any send log data that is available and enter the "complete" status; and (F) if the SLJ process itself experiences a persistent error (e.g., the error keeps occurring after a number of retries spaced apart by some interval), then either (F.i) or (F.ii) may occur.

(F.i) If the error is identified as a fatal error then the error may be logged and the SLJ process status may be set to "canceled." Fatal errors may occur when the staging table or send logging data extension table are not found in the client database or if none of the columns in the job send log staging table 310 match any columns in the send log DE 320. The publish process may be developed to be as resilient as possible so it tolerates schema changes during the send as long as the writes to the send log DE 320 remain possible. If columns are dropped from the send log DE 320 during the send, the publish routine may automatically stop trying to publish those columns. If columns are added during the send, the SLW 315 may not publish to the newly added columns; however, the newly added columns may either have defaults or allow nulls so the writes may continue to succeed. If the SLW 315 cannot continue to publish due to structure loss or change, the SLJ process may be canceled.

(F.ii) If an unexpected error, such as a timeout or network communication failure, repeatedly occurs, the SLJ process may be put into an "error" state so such problems can be monitored for and corrected. SLJ publishing that is in an error state may be resumed using the Job Explorer tool (discussed infra). An example error monitoring query is shown by table 7.

TABLE 5 example error monitoring query

-- This query identifies any Job Send Log processes
-- that are in error status for the past two days
SELECT * FROM dbo.JobSendLog
WHERE CreateDate >= DATEADD(HH, −48, SYSDATETIME( ))
    AND JobSendLogStatusID = 110;

The query shown by table 5 may be used in cases where SLJ process is placed into the "error" state. If this query returns a row for a job, then the SLJ process may be resumed once the problem(s) has/have been corrected through the Job Explorer tool (discussed infra).

In various implementations, the SLW 215 may generate or create an OMM Send Log Status table (dbo.OMMSendLogStatus), which may be used internally by the SLW 315 to track the progress of the data transfer per staging table 310 partition. In particular, the SLW 315 may use the dbo.OMMSendLogStatus to keep track of its own state so that data is not moved to the message send DE 320 more than once. In this regard, each time the SLW 320 performs an action, the SLW 320 may update the dbo.OMMSendLogStatus. Additionally, the data stored in the dbo.OMMSendLogStatus for each job may be deleted when the job processing is completed (e.g., at or after node 7). An example of the dbo.OMMSendLogStatus is shown by table 6.

TABLE 6 example dbo.OMMSendLogStatus

| Column Name | Type | Null | Default |
| --- | --- | --- | --- |
| EID | bigint | | |
| MID | bigint | | |
| JobID | bigint | | |
| PartitionNumber | int | | |
| MinCustomObjectKey | bigint | | |
| MaxCustomObjectKey | bigint | | |
| OMMSendLogStatusID | tinyint | | ((0)) |
| CreateDate | datetime2(4) | | (getdate( )) |
| ModifiedDate | datetime2(4) | | (getdate( )) |

Compression State: Row

In the example of table 6, the EID, MID, and JobID fields/data elements may be the same or similar to the EID, MID, and JobID fields/data elements discussed previously with regard to table 2. The PartitionNumber field/data element may indicate a current partition of a staging table 310 from which data is scooped out. The MinCustomObjectKey and the MaxCustomObjectKey may indicate a segment of data within a partition that is currently being scooped out of, or otherwise removed from, the staging table(s) 310, where the MinCustomObjectKey may indicate a beginning or starting portion of the segment and the MaxCustomObjectKey may indicate an end portion of the segment. The CreatedDate may indicate when one or more rows have been created in the dbo.OMMSendLogStatus, and the ModifiedDate may indicate a time when a last write operation was performed on the dbo.OMMSendLogStatus.

Additionally, the dbo.OMMSendLogStatus may include one or more indexes, which may be used to look up data when going through the data logging process. Supports efficiently finding the row BG process makes row for each partition of each table and keeps track of each partition by updating the table. More efficient to scoop one partition at a time (accessing one location on disk) instead of pulling many disk fragments. An example of the index information for the dbo.JobSendLog is shown by table 7.

TABLE 7 example Index Information for dbo.OMMSendLogStatus

| Cl | Un | PK | Cmpr | Index Name | Columns |
|---|---|---|---|---|---|
| X | X | X | Row | PK_OMMSendLogStatus_JobID_PartitionNumber | JobID, PartitionNumber |

In the example of table 6, PK_OMMSendLogStatus_JobID_PartitionNumber may be used to look up an individual job by JobID or by PartitionNumber.

In addition, the OMM 350 may support the OMM configuration settings/parameters at the stack, service cluster, and client (MID) levels. The OMM configuration settings/parameters may allow the TP 370 and/or an operator of the system 16 to configure how the OMMs 350 are to perform the two-stage SLJ process. For example, the TP 370 or the system 16 operator may define a minimum number of subscribers per SLJ that are needed to use the two-stage process; an amount of time that the SLW 315 is to idle between SLJs; a batch size in number of rows per write operation; a number of rows/records to be stored in each staging table 310 partition; and/or other like settings. Example configuration settings are shown by table 8.

TABLE 8 example OMM configuration parameters

| OMM Configuration Parameter | Description |
|---|---|
| MinSubscriberCountForTwoStepSendLogWrite | The minimum number of candidate job subscribers for a send to qualify for the two step send logging process. Defaults to 10,000. |
| TwoStepSendLogWriteIdleSeconds | The number of seconds that the OMM Job Log Writer slot will idle between publish operations to copy the send log data from the staging table to the send log data extension. Defaults to 120 seconds. |
| TwoStepSendLogWriteBatchSize | The number of rows in the batches the OMM Send Logging Writer publishes from the staging table to the send log data extension. Defaults to 5,000. |
| TwoStepSendLogPartitianChunkSize | The number of rows with concurrent identity values stored in each partition of the staging table. for example, if this is set to 50 identity values 0-49 would be stored in partition 1, identity values 50-99 would be stored in partition 2, and so on to identity values 450-499 being stored in partition 10 and identity values 500-549 being stored in partition 1 . . . Defaults to 1. |

Referring back to FIG. 3, after the job has completed the sending stage, at node 7 the SLW 315 may delete the staging tables 310. In one example, the SLW 315 may run one more publish iteration, and then truncate and drop the staging table 310, clean up the state data in the dbo.OMMSendLogStatus, set the job send logging process complete, and archive its slot. In various embodiments, the SLW 315 does not delete the data from the staging tables 310 as it is written to the send log DEs 320. Rather, the completed row identifier is maintained for each partition in a OMM Send Log Status DBO (dbo.OMMSendLogStatus). In one example implementation, a server object, dbo.spOMMSendLogCleanup, when executed, may cause the SLW 315 to clean up the data and objects when job send log processing is complete.

II.C Effects of the Message Logging Mechanisms

The two-stage send logging process of the example embodiments may provide advantageous effects for the multi-tenant system 16. A first effect includes reducing overhead and latency resulting from a large volume of write activity caused by the send logging feature. For example, the multi-tenant system 16 may receive millions of MSRs, which may require hundreds of producer instances to simultaneously write millions of rows of send log data to a single tenant's send log DE 320 in a few minutes. To address this problem, embodiments may the previously described two-stage send logging process, which is a counter intuitive approach because the two-stage send logging process doubles the number of write operations actually being performed. Although the two-stage process is counterintuitive, the embodiments reduce computational overhead and write latency by distributing the write operations allowing a database engine of system 16 (not shown) to process write operations in parallel. This is accomplished by a two level design.

At a first (high) level, the staging tables 310 are automatically created and deleted for each large campaign (e.g., an SLJ) to reduce the database contention created by simultaneously processing jobs all writing to the same data store (e.g., the message send DEs 320 and/or tenant DB 22).

At a second (granular) level, the two-stage process may allow the database engine to chunk and shard data being written to a single SLJ's staging table 310 by partitioning the staging table 310 on an automatically generated computed column based on a configurable chunk size. In an example, the computed column may be determined using equation 1:

$$CC = ((ICV - (ICV \% CS)) \% (CS*10))/CS \qquad \text{[Equation 1]}$$

In equation 1, CC is the computed column; ICV is the Identity Column Value; and CS is the Chunk Size. The I Identity Column Value is the value of an automatically incremented by 1 for each row integer column and the Chunk Size is the configured number of sequential rows targeting each partition. As an example, when the chunk size is configured to be fifty, an individual producer (SLW 315) may write to one or two of ten staging table 310 partitions when the individual producer performs a write operation of up to fifty rows. At the same time, other producers may be writing to alternate partitions. In this way, the write operations may be distributed.

A second effect on the system 16 may involve the process (es) that moves the send log data from the staging tables 310 into the message send DEs 320. Typical send logging mechanisms may depend on a database job to move the send log data to a message send DE 320, and slowdowns and overloads may occur when hundreds of processes all attempt to write data to a small number of rows/records in the message send DE 320. The embodiments herein automatically launch a job specific consumer slot/thread (e.g., SLW 315) that periodically moves the data from a staging table 310 into a corresponding message send DE 320. The job specific consumer slot/thread (e.g., SLW 315) is a single process that operates on a per-job basis and spends tens or hundreds of milliseconds picking up large chunks of data from each of the staging table 310 partition and moving the data into the message send DE 320. The two-stage send logging process is more efficient than conventional message logging mechanisms as it separates write operations of data into the message send DE 320 from the message sending engine so that delays in message sending is reduced or eliminated.

III. Example User Interfaces

Figure 4:
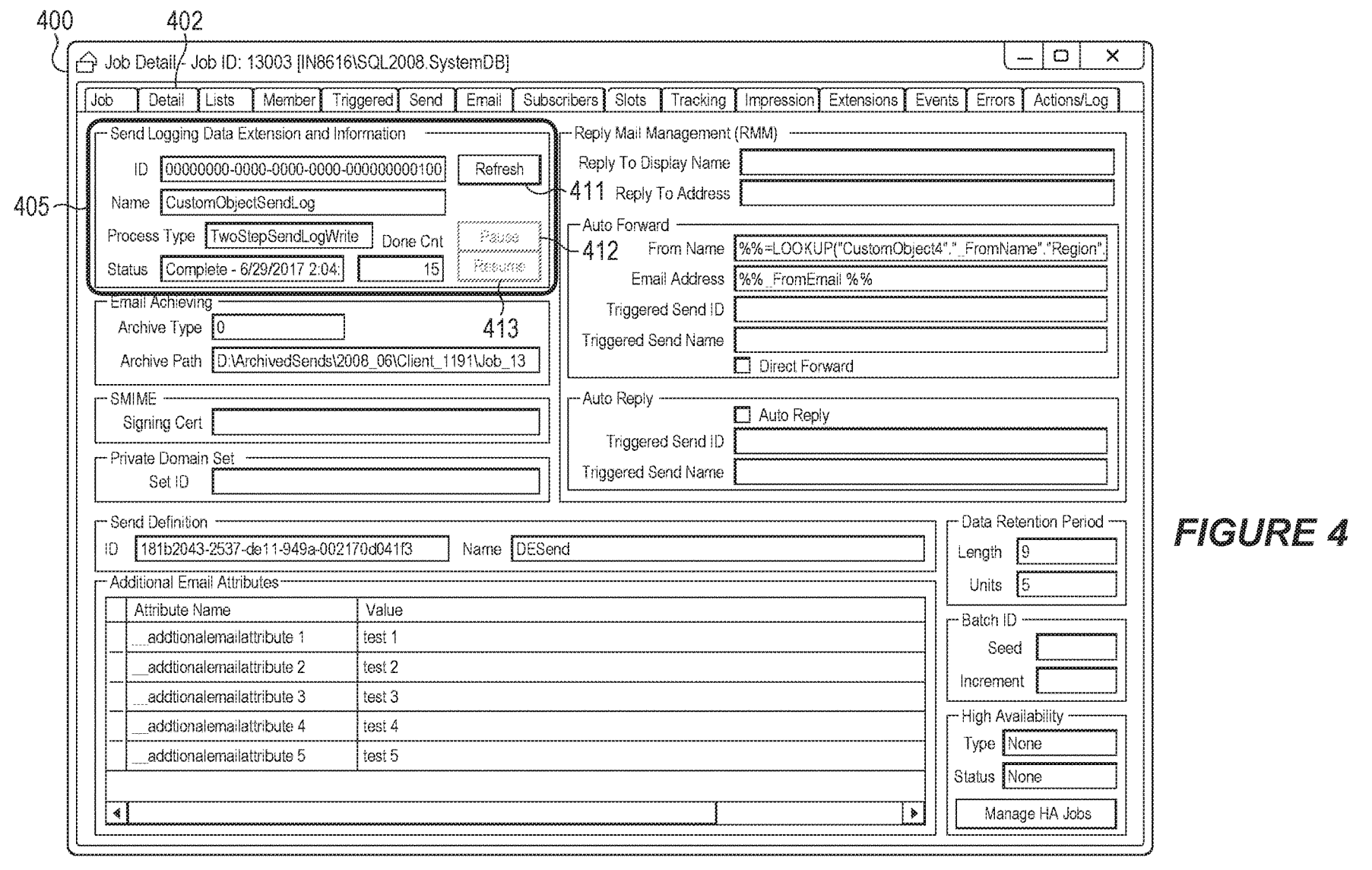

FIG. 4 shows an example Job Detail form GUI 400 for monitoring and managing SLJ functionality, according to various embodiments. The Job Detail form GUI 400 may correspond to the UI 30 discussed previously with regard to FIG. 1B and FIG. 3. The Job Detail form GUI 400 may a GUI instance of a Job Detail form of a Job Explorer tool, wherein the Job Detail form may be accessed by selecting the Detail tab 402. The SLJ functionality may be accessed or monitored using the "Send Logging Data Extension and Information" section 405 in the Job Detail form GUI 400. In this example, the section 405 shows an SendLogJobID of an SLJ, a name of the message send DE 320, a process type (e.g., "Two Step SendLogWrite" in FIG. 4), a status of the SLJ and a time of the status (e.g., "Complete—6/29/2017 2:04" in FIG. 4), and a send log data transfer count (e.g., "15" records in FIG. 4).

When the two stage send logging process is active for the SLJ, the process type field may display "TwoStepSendLogWrite" shown by FIG. 4. In this example, when the standard send logging process wherein the OMM 350 writes the send log data directly to the send log DE 320, the process type field may display "DirectSendLogWrite." When no send logging is active for the SLJ, the process type field may be blank or may display "NoSendLogWrite" or the like, and the other fields may be blank.

The section 405 may also include various graphical control elements (GCEs) for managing or controlling the SLJ processing. In this example, GCE 411 may refresh the fields of the section 405 or otherwise fetch up-to-date values for those fields. Additionally, the SLJ publishing process itself can be paused and resumed using the GCE 412 and GCE 413, respectively. In FIG. 4, the GCEs 412 and 413 are greyed out to indicate that these GCEs are disabled, however, the GCEs 412 and 413 may be enabled during the job sending phase to allow the publishing of the send log process to be managed. The "Pause" button 412, when selected, may clear a displayed error alert, and the "Resume" button 413, when selected, may kick off the SLJ process and/or may resume SLJ processing after any errors/problems have been researched and corrected.

Figure 5:
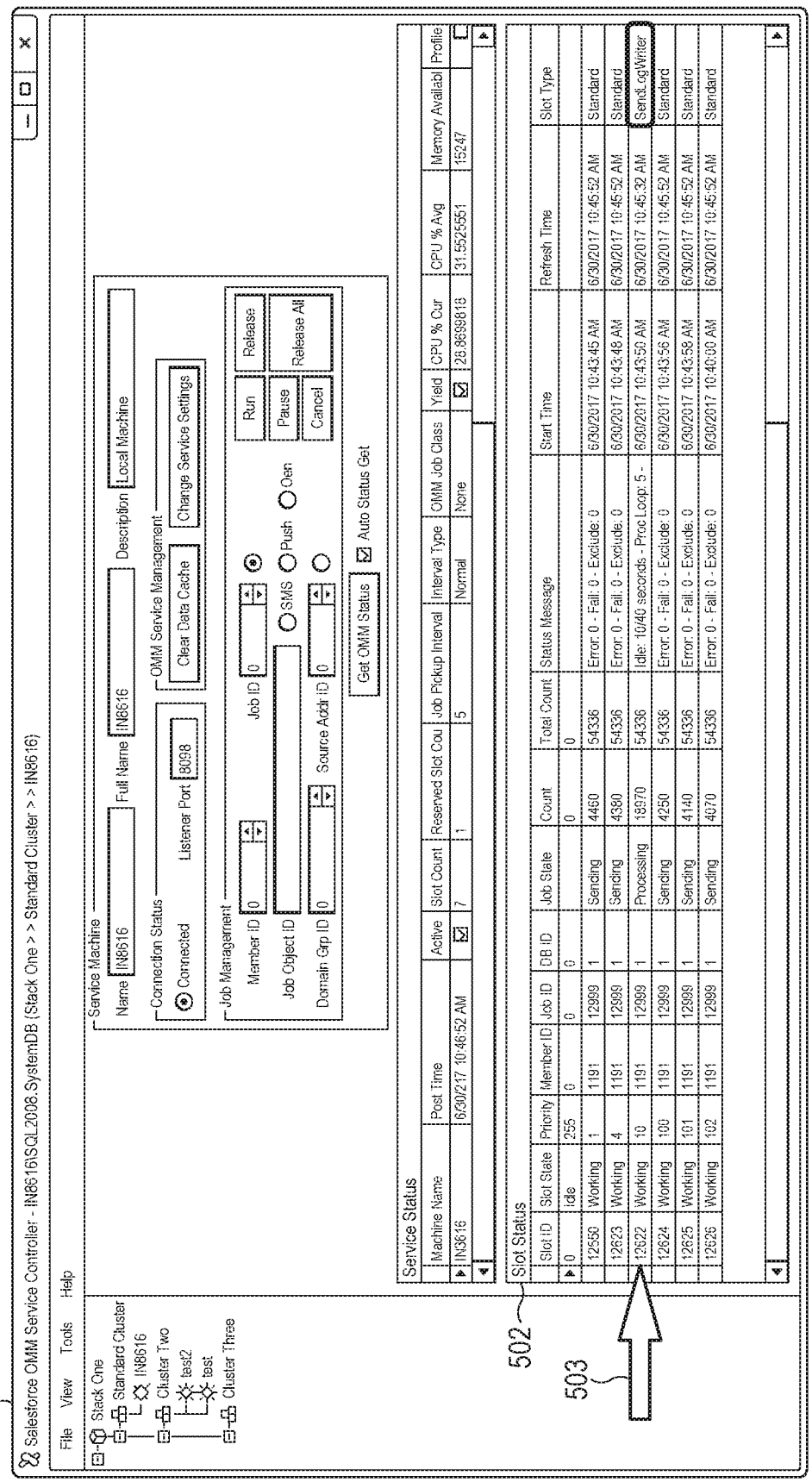
FIG. 5 shows an example graphical user interface for controlling mail server functionality, according to various embodiments.

FIG. 5 shows an example GUI 500 for controlling OMM 350 functionality, according to various embodiments. The GUI 500 may a GUI instance of a OMM Service Controller Support tool. The GUI 500 may correspond to the UI 30 discussed previously with regard to FIG. 1B and FIG. 3. In this example, the GUI 500 includes a slot status section 502, which indicates the status of multiple writer slots (e.g., SLWs 315). In this example, the slot status section 502 includes a job slot entry 503, which indicates an SLW 315 having a Slot ID of "12622" as having a slot type of "SendLogWriter." The job slot entry 503 in the slot status section 502 can be double clicked to bring up the Job Detail form GUI 400 of FIG. 4 used to manage the process.

Figure 6:
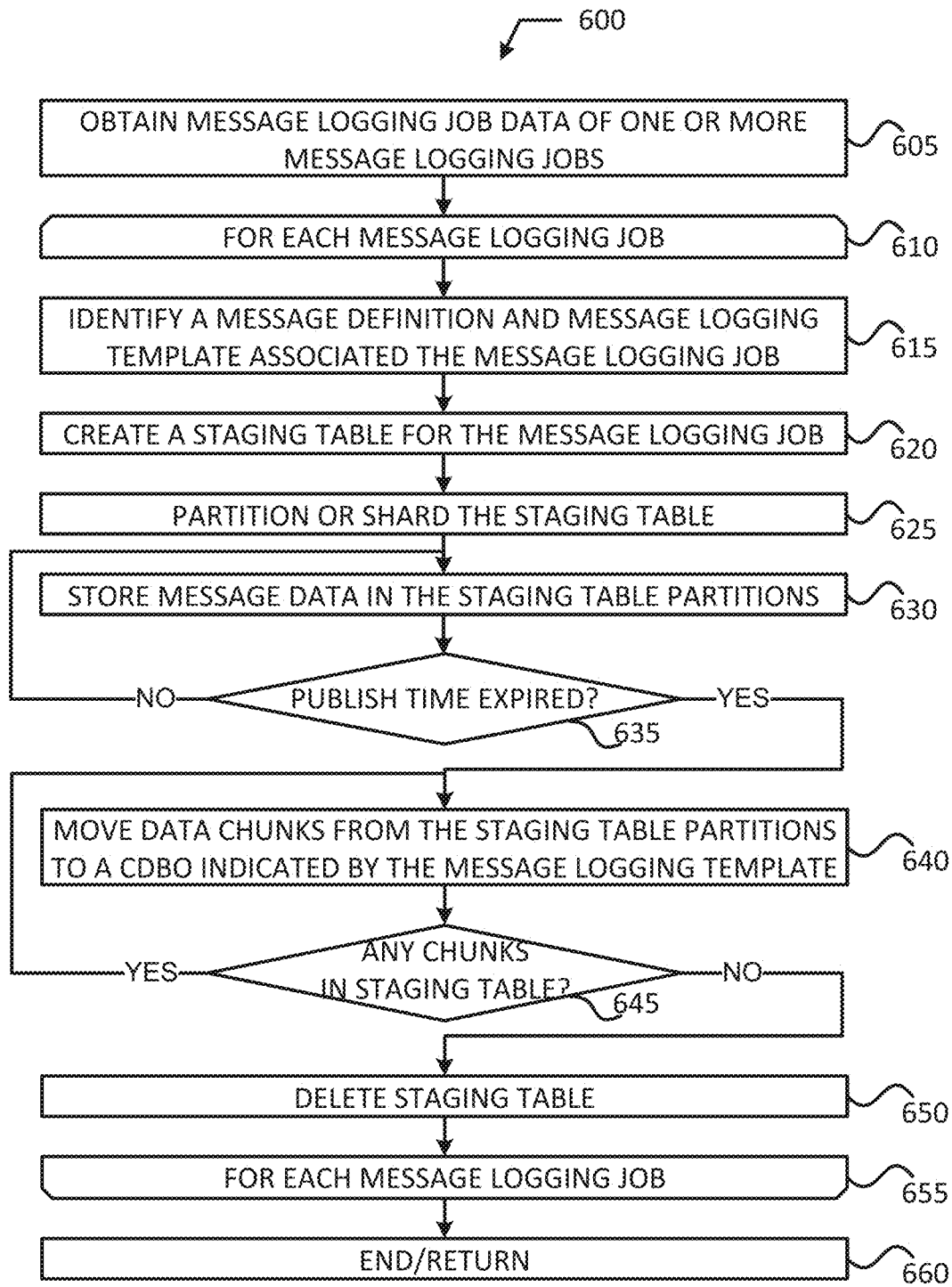
FIG. 6 shows a two-stage message logging process that may be performed by a mail server in accordance with various embodiments.

FIG. 6 illustrates a two-stage message logging process 600, according to various embodiments. For illustrative purposes, the operations of process 600 are described as being performed by elements/components/devices shown and described with regard to FIGS. 1A-3; however, other computing devices may operate the depicted processes in a multitude of implementations, arrangements, and/or environments. In embodiments, the processes may be embodied as program code stored in a memory system, which when executed by a processor system of a computer system, causes the computer system to perform the various operations of such processes. While particular examples and orders of operations are illustrated in FIG. 6, in various embodiments, these operations may be re-ordered, separated into additional operations, combined, or omitted altogether.

Process 600 may begin at operation 605 where a processor system of an OMM 350 (or a slot 303/304 of the OMM 350) may obtain message logging data of one or more message logging jobs. In embodiments, the message logging job data may be stored in a message logging job queue. At operation 610, the processor system of the OMM 350 may process each message logging job in turn. At operation 615, the processor system of the OMM 350 may identify a message definition and a message logging template associated with the message logging job. The message definition and a message logging template may be indicated by a message (send) definition ID field and a message (send) logging template ID, respectively, of the message logging job data or corresponding message processing job data. Additionally, the message logging template may indicate a custom database object (CDBO) 320 in which message data is to be stored.

At operation 620, the processor system of the OMM 350 may create a staging table 310 for the message logging job. In embodiments, the processor system may create the staging table 310 to have a same or similar structure as the CDBO 320 indicated by the message logging template. At operation 625, the processor system of the OMM 350 may partition or shard the staging table 310 into two or more partitions. In embodiments, two or more staging table 310 partitions may be stored on different datastores or data storage devices than other ones of the two or more staging table 310 partitions.

At operation 630, the processor system of the OMM 350 may store message data in the staging table 310 partitions. The particular data to be stored in the staging table 310 partitions may be defined by the message logging template identified at operation 615. The processor system of the OMM 350 may implement any suitable storage mechanism to store the message data in the staging table 310 partitions. In embodiments, the processor system of the OMM 350 may write the data to each of the two or more staging table 310 partitions in parallel. In embodiments, operation 630 may involve the processor system obtaining or identifying a number of subscribers or recipients that are to receive a built message, creating a row or record for each subscriber/recipient, and identifying or determining whether any of the columns/fields to be included in the staging table 310 are to include default values or index keys.

At operation 635, the processor system of the OMM 350 may determine whether a publish time has expired. In embodiments, operation 635 may be performed after all of the message data is stored in the staging table 310 partitions. In embodiments, the publish time may be a predefined or configurable interval at which data is to be transferred out of the staging table 310 partitions. If at operation 635, the processor system of the OMM 350 determines that the publish time has not expired, then the processor system of the OMM 350 may loop back to perform operation 630 to store message data in the staging table partitions, if any. In other embodiments, the processor system may loop back to perform operation 640 to continue to monitor for expiration of the publish time.

If at operation 635, the processor system of the OMM 350 determines that the publish time has expired, then the processor system of the OMM 350 may proceed to operation 640 to publish or otherwise move chunks of the message data from the staging table 310 partitions to the CDBO 320 indicated by the message logging template. In embodiments, operation 640 may involve the processor system obtaining or identifying the staging table 310 itself, tracking the columns/fields that need to be mapped between the staging table 310 and the CDBO 320 for the bulk copy operation, obtaining or identifying a database object that corresponds to the CDBO 320, creating a row/record in the CDBO 320 for each update object of the data chunk, and populating each row/record in the CDBO 320 with corresponding data items in the staging table 310. Some embodiments may also involve the processor system tracking the number of times a particular column has been identified for the mapping, determining whether any of the columns include default values or index keys, and performing validity or verification checks to make sure that the columns that include default values or index keys has a value for those columns. In some embodiments, the processor system of the OMM 350 may write data chunks from individual staging table 310 partitions to corresponding locations in the CDBO 320 in a predefined order or in parallel.

At operation 645, the processor system of the OMM 350 may determine whether any more data chunks are remaining in the staging table 310 partitions. If at operation 645 the processor system determines that there are data chunks remaining in the staging table 310 partitions, then the processor system of the OMM 350 may loop back to operation 640 to move or publish the data chunks to the CDBO 320. If at operation 645 the processor system determines that there are no data chunks remaining in the staging table 310 partitions, then the processor system of the OMM 350 may proceed to operation 650 to drop the staging table 310. In embodiments, operation 650 may involve the processor system clearing any bulk loaded cache for the CDBO 320 that were updated. At operation 655, the processor system of the OMM 350 may loop back to operation 610 to process a next message logging job, if any. After all message logging jobs have been processed, the processor system of the OMM 350 may proceed to operation 660 to end process 600 or to repeat process 600 as necessary.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

The disclosed implementations can be embodied in the form of various types of hardware, software, firmware, or combinations thereof, including in the form of control logic, and using such hardware or software in a modular or integrated manner. Other methods are possible using hardware and a combination of hardware and software. Additionally, any of the software components or functions described in this application can be implemented as software code to be executed by one or more processors using any suitable computer language such as Java, C++ or Perl using, for example, existing or object-oriented techniques. The software can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

The implementations described herein are presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer-readable media (NTCRM) comprising instructions, wherein execution of the instructions by one or more processors of a message server is to cause the message server to:
    obtain a message send request (MSR) from a tenant platform of a set of tenant platforms, the MSR indicating a user interaction with the tenant platform that caused the MSR to be sent; and
    in response to receipt of the MSR,
        identify a message definition and a message logging definition that were configured by the tenant platform, wherein:
            the message definition defining how to generate a message for a recipient based on a user interaction indicated by the MSR and defining a message job including a set of related messages to be sent to a set of recipients, and
            the message logging definition defining data items of the message to be stored in a custom database object (CDBO),
        construct the message according to the message definition,
        create, before or during the construction of the message, a staging table to store the data items indicated by the message logging definition, wherein the staging table is to only store data items related to messages of the message job,
        write, during the construction of the message, the data items to the staging table,
        instantiate a message log writer (LWL) instance of a LWL process for the message job, the LWL instance to write data items of the message job to the staging table, and
        write, at a predefined interval during or after construction of the message, the data items from the staging table to the CDBO.

2. The NTCRM of claim 1, wherein execution of the instructions is to cause the message server to: generate the staging table to have a same structure as the CDBO.

3. The NTCRM of claim 2, wherein execution of the instructions is to cause the message server to:
    shard the staging table into a plurality of partitions, each of the plurality of partitions being located on a different storage device than other ones of the plurality of partitions.

4. The NTCRM of claim 1, wherein, to write the data items from the staging table to the CDBO, execution of the instructions is to cause the message server to:
    perform a chunking operation to write the data items from the staging table to the CDBO in sets of one or more chunks.

5. The NTCRM of claim 1, wherein each LWL instance is a background process that runs while a message construction process constructs the message.

6. The NTCRM of claim 1, wherein each LWL instance is to shut down or transition to an idle mode when all data items in the staging table are transferred to the CDBO.

7. The NTCRM of claim 1, wherein execution of the instructions is to cause the message server to:
    operate each LWL instance to delete the staging table after all the data items in the staging table have been transferred to the CDBO.

8. A computer system to be employed as an Outgoing Message Manager (OMM) entity, the computer system comprising:
    a network interface configurable to obtain message send data from a message send job queue (MSJQ), the message send data indicating recipient-specific attributes;
    a processor system coupled with a memory system, the processor system configurable to:
        identify a message definition and a message logging configuration indicated by the obtained message send data, wherein the message definition and the message logging configuration were previously configured by a service provider platform (SPP), wherein the message definition defines one or more message jobs, each of the one or more message jobs is a set of related messages to be sent to a set of recipients;
        construct a message to be sent to one or more recipients according to the message definition,
        create, before or during the construction of the message, a staging table to store data items indicated by the message logging configuration, wherein the staging table is to only store data items related to messages of the message job,
        instantiate a message log writer (LWL) instance of a LWL process for each of the one or more message jobs, wherein the LWL instance is, during the construction of the message, to write data items of a corresponding message job to the staging table and indicated by the message logging configuration to the staging table, and
        during or after construction of the message, write the data items from the staging table to a custom database object (CDBO) indicated by the message logging configuration at an interval; and the network interface is configurable to send the constructed message to the one or more recipients according to a message delivery mechanism indicated by the message send data or the message definition.

9. The computer system of claim 8, wherein the processor system is configurable to: generate the staging table to have a same structure as the CDBO.

10. The computer system of claim 9, wherein the processor system is configurable to:

shard the staging table into a plurality of partitions, each of the plurality of partitions being located on a different storage device than other ones of the plurality of partitions.

11. The computer system of claim 8, wherein, to write the data items from the staging table to the CDBO, wherein the processor system is configurable to:

perform a chunking operation to write the data items from the staging table to the CDBO in sets of one or more chunks.

12. The computer system of claim 8, wherein the processor system is further configured to construct the message to be sent to the one or more recipients further according to recipient-specific attributes, wherein the recipient-specific attributes include one or more of attributes of the one or more recipients to be used to build personalized messages, content specific to the one or more recipients to be included in the message, and messages to be generated based on respective user interactions with the SPP.

13. The computer system of claim 8, wherein each LWL instance is a background process that runs while a message construction process constructs the message.

14. The computer system of claim 8, wherein each LWL instance is to shut down or transition to an idle mode when all data items in the staging table are transferred to the CDBO.

15. The computer system of claim 8, wherein the processor system is configurable to:

operate each LWL instance to delete the staging table after all the data items in the staging table have been transferred to the CDBO.

16. A system to provide a message send logging for a set of tenant platforms, the system comprising:

a plurality of application (app) servers, wherein each app server of the plurality of app servers are configurable to:

obtain send definitions and send logging configurations from the set of tenant platforms, wherein the send definitions define individual message send jobs (MSJs), wherein the individual MSJs are sets of related messages to be sent to a set of recipients, store the send definitions and the send logging configurations in corresponding tenant spaces of the set of tenant platforms, and store, in response to receipt of individual message send requests (MSRs) from respective tenant platforms of the set of tenant platforms, the individual MSRs in a message send job queue (MSJQ) as the individual MSJs; and a plurality of Outgoing Message Managers (OMMs), each OMM of the plurality of OMMs is configurable to, for each MSJ obtained from the MSJQ:

identify a send definition and a send logging configuration based on information indicated by the obtained MSJ, construct a message to be sent to one or more intended recipients according to the identified send definition and based on recipient-specific parameters indicated by the obtained MSJ, create, before or during the construction of the message, a staging table to store data items indicated by the send logging configuration, wherein the staging table is to only store data items related to messages of the MSJ, instantiate a message log writer (LWL) instance of an LWL process for each of the MSJ, the LWL instance to, during the construction of the message, write data items indicated by the identified send logging configuration to the staging table, and write, at a predefined interval during or after construction of the message, the data items from the staging table to a custom database object (CUBO) that is defined by the send logging configuration.

17. The system of claim 16, wherein each OMM of the plurality of OMMs are configurable to:

generate respective staging tables for each MSJ obtained from the MSJQ; and partition or shard the respective staging tables into a plurality of staging table partitions, each of the plurality of staging table partitions being located on different storage devices than other ones of the plurality of staging table partitions.

* * * * *